United States Patent [19]
Mizoguchi et al.

[11] Patent Number: 5,754,579
[45] Date of Patent: May 19, 1998

[54] LASER GAS CONTROLLER AND CHARGING/DISCHARGING DEVICE FOR DISCHARGE-EXCITED LASER

[75] Inventors: Hakaru Mizoguchi; Toshihiro Nishisaka, both of Hiratsuka; Hiroshi Komori, Isehara, all of Japan

[73] Assignee: Komatsu Ltd., Tokyo, Japan

[21] Appl. No.: 750,538
[22] PCT Filed: May 26, 1995
[86] PCT No.: PCT/JP95/01015
 § 371 Date: Dec. 13, 1996
 § 102(e) Date: Dec. 13, 1996
[87] PCT Pub. No.: WO95/34927
 PCT Pub. Date: Dec. 21, 1995

[30] Foreign Application Priority Data

Jun. 16, 1994 [JP] Japan .................. 6-134468
Aug. 26, 1994 [JP] Japan .................. 6-202273

[51] Int. Cl.⁶ ............................. H01S 3/22
[52] U.S. Cl. .................. 372/58; 372/38; 372/86
[58] Field of Search ............. 372/58, 59, 86, 372/38

[56] References Cited

U.S. PATENT DOCUMENTS 5,450,436  9/1995  Mizoguchi et al. ............. 372/58

FOREIGN PATENT DOCUMENTS

| 58-223392 | 12/1983 | Japan . |
| 60-263485 | 12/1985 | Japan . |
| 63-078587 | 4/1988 | Japan . |
| 01033981 | 2/1989 | Japan . |
| 01191490 | 8/1989 | Japan . |
| 02103977 | 4/1990 | Japan . |
| 03117378 | 5/1991 | Japan . |
| 03124273 | 5/1991 | Japan . |
| 03135089 | 6/1991 | Japan . |
| 03166783 | 7/1991 | Japan . |
| 04137576 | 5/1992 | Japan . |

*Primary Examiner*—Leon Scott, Jr.
*Attorney, Agent, or Firm*—Varndell Legal Group

[57] ABSTRACT

A first object is to stabilize output of laser light. In order to achieve the first object, if it is detected by an output detection means (15) that the output (E) of laser light (La) has departed from a target value, whilst maintaining the voltage of a power source (17) at a fixed value or in a fixed range, the amount of laser gas supplied to a laser chamber (4) is controlled such that the output (E) of laser light becomes the target value. A second object is to reduce the wear of the pre-ionization electrodes and to prevent drop in output of laser light. The second object is achieved as follows. Specifically, the pulse current discharged from primary capacitor (C1) is stepped up in voltage by a pulse transformer and is charged onto a secondary capacitor (C2). At this point a magnetic switch (SR) that is connected to the downstream side of secondary capacitor (C2) becomes saturated and becomes conductive, allowing current to pass through pre-ionization electrodes (6) that are connected in series with the magnetic switch (SR). At the time-point where the movement of charge of secondary capacitor (C2) has finished, a discharge current in the reverse direction tries to flow in secondary capacitor (C2) but magnetic switch (SR) acts to block the reverse current, stopping the pre-ionization discharge. Concurrently with this the core of pulse transformer (20) is saturated, with the result that charge starts to move from secondary capacitor (C2) to peaking capacitor (C4). The voltage of peaking capacitor (C4) therefore rises until it reaches the discharge initiation voltage, and laser oscillation is performed.

10 Claims, 22 Drawing Sheets

| 1 CHARGING/DISCHARGING CIRCUIT | 14a VALVE |
| 2 SUPPLY/EVACUATION CIRCUIT | 18 MAIN SWITCH(THYRISTOR) |
| 4 LASER CHAMBER | 19 MAGNETIC ASSIST |
| 5 MAIN ELECTRODES | SR MAGNETIC SWITCH |
| 6 PRE-IONISATION ELECTRODES | 20 PULSE TRANSFORMER |
| 8 BLOWER | |

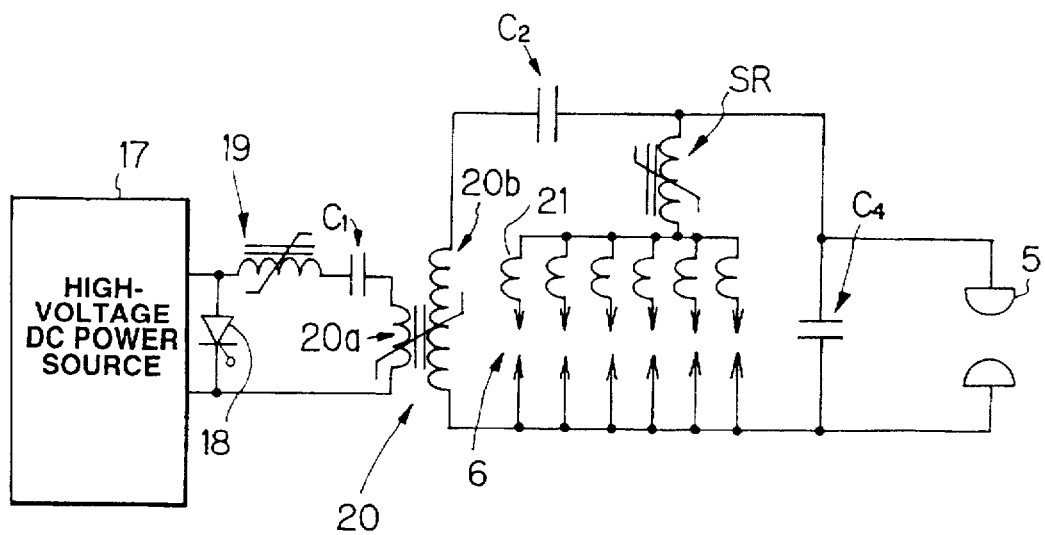

5 MAIN ELECTRODES
6 PRE-IONIZATION ELECTRODES
18 MAIN SWITCH (GTO THYRISTOR)
19 MAGNETIC ASSIST
SR MAGNETIC SWITCH
20 PULSE TRANSFORMER (SATURABLE TRANSFORMER)
21 INDUCTORS
C1 PRIMARY CAPACITOR
C2 SECONDARY CAPACITOR
C4 PEAKING CAPACITOR

FIG.15

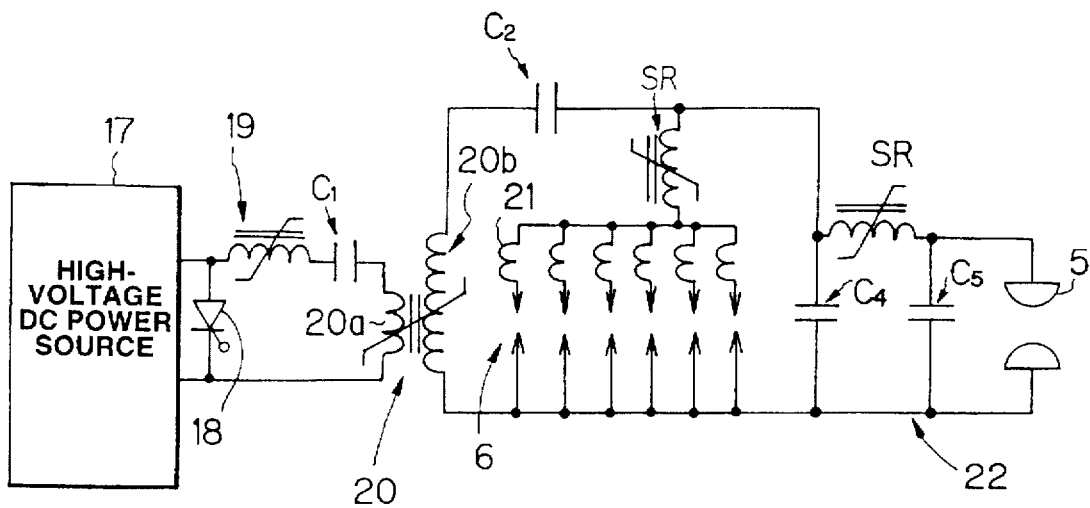

5 MAIN ELECTRODES
6 PRE-IONIZATION ELECTRODES
18 MAIN SWITCH (GTO THYRISTOR)
19 MAGNETIC ASSIST
SR MAGNETIC SWITCH
20 PULSE TRANSFORMER (SATURABLE TRANSFORMER)
21 INDUCTORS
C1 PRIMARY CAPACITOR
C2 SECONDARY CAPACITOR

FIG.16

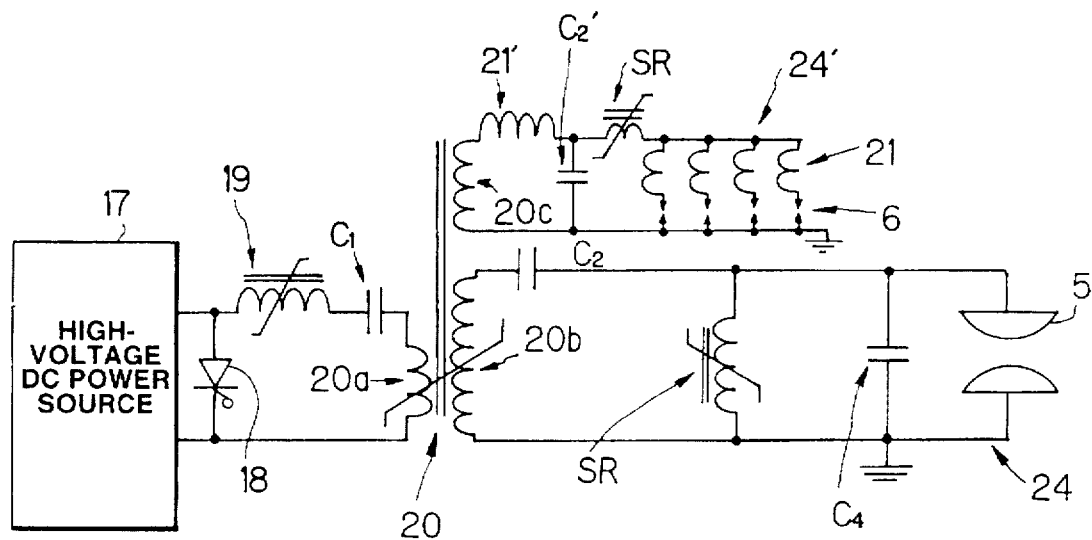

5 MAIN ELECTRODES
6 PRE-IONIZATION ELECTRODES
18 MAIN SWITCH (GTO THYRISTOR)
19 MAGNETIC ASSIST
SR MAGNETIC SWITCH

20 PULSE TRANSFORMER (SATURABLE TRANSFORMER)
21' INDUCTORS
C1 PRIMARY CAPACITOR
C2 SECONDARY CAPACITOR
C4 PEAKING CAPACITOR

FIG.19

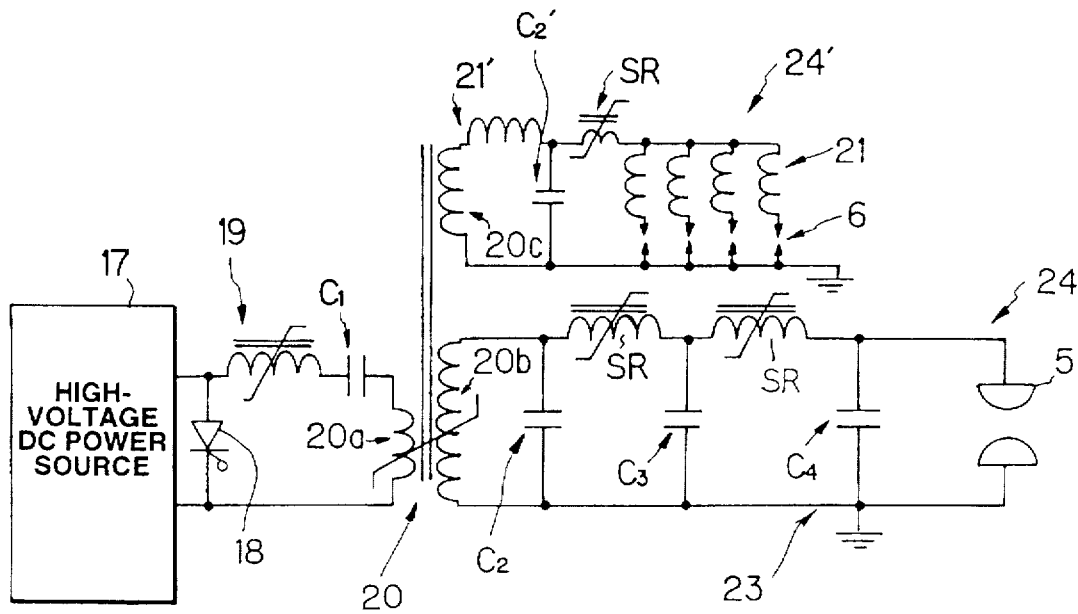

5 MAIN ELECTRODES
6 PRE-IONIZATION ELECTRODES
18 MAIN SWITCH (GTO THYRISTOR)
19 MAGNETIC ASSIST
SR MAGNETIC SWITCH

20 PULSE TRANSFORMER
21' INDUCTORS
C1 PRIMARY CAPACITOR
C2 SECONDARY CAPACITOR
C2' SECONDARY CAPACITOR

FIG.20

4 LASER CHAMBER
5 MAIN ELECTRODES
6 PRE-IONISATION POWER SOURCE
8 BLOWER

LASER GAS CONTROLLER AND CHARGING/DISCHARGING DEVICE FOR DISCHARGE-EXCITED LASER

TECHNICAL FIELD

The present invention relates to a discharge-excitation type laser device that is employed as a light source for the processing of materials or for reduction-projection, etc., and more particularly to a device that controls the supply of the laser gas, and to a charging/discharging device therefor.

BACKGROUND ART

Discharge-excitation type laser devices are employed not only for material processing such as marking, hole-forming or annealing, but also as light sources of photolithography for producing the circuit patterns of large-scale integrated circuits (LSIs).

Among gas lasers, excimer lasers in particular provide powerful ultraviolet light sources; this property is exploited in their use for material processing, chiefly in marking and hole-forming of organic materials such as resins. Also, in photolithography, the reduction-projection method is chiefly employed, in which a circuit pattern is formed by projecting on to a photosensitive substance on a semiconductor substrate by a reduction-projection optical system the light that passes through an original image (reticle) pattern illuminated by an illuminating light source.

The resolution of this projected image is limited by the wavelength of the light source that is used, so there has been a gradual trend to decrease the wavelength of the light source that is used from the visible region to the ultraviolet region. Conventionally, as the light source for the ultraviolet region, use is made of the g ray (436 nm) and i ray (365 nm) generated by a high-voltage mercury lamp. However, with minimum pattern line widths of less than 0.35 μm being demanded at 64 MB, the limits in terms of wavelength are already being approached even for the i ray.

Deep ultraviolet laser light sources are viewed as promising for solving this technical limitation. In particular, with excimer lasers, strong oscillations can be obtained at the wavelengths of KrF (248 nm) or ArF (193 nm) etc., depending on the composition of the gaseous medium, with high output and high efficiency. On the other hand, in the deep-UV region, the glass or crystalline materials that may be used to constitute the reduction-projection lens system are extremely restricted, so the chromatic aberration correction that was employed in a reduction-projection lens system using a mercury lamp is difficult to implement.

Rather than by correcting the chromatic aberration of the lens system, this difficulty is therefore eliminated by reducing the spectral bandwidth of the output light to such an extent that chromatic aberration of the lens material can be neglected, by arranging a wavelength selection element within the laser resonator. By this method, the spectral bandwidth, which is a few nm in the case of natural oscillation, can be reduced to a few pm.

The laser output beam of an excimer laser device employed in such bandwidth reduction is obtained by throwing the electrical energy stored on a capacitor for laser excitation into the discharge space to create electrical discharge in the gaseous laser medium.

FIG. 24 shows the layout of a conventional excimer laser device, and FIG. 25 shows in particular the charging/discharging electrical circuit therefor. Usually an automatic pre-ionisation capacitative transfer circuit is employed for the charging/discharging circuit, on account of its straightforward construction.

In more detail, primary capacitor C1 for charge storage is charged up to the prescribed voltage by charger 26, and charging (charge transfer) on to secondary capacitors (peaking capacitors) C2 is commenced when switch element Q conducts, being made conductive by discharge of a thyratron etc. in response to a trigger pulse that is subsequently output from a trigger pulse generator 25. On this charge transfer, the charging current i1 is conducted to a few tens of pre-ionisation electrodes 6, which are arranged on both side faces of main electrodes (discharging electrodes within the laser chamber) 5. Pre-ionising discharge is thereby generated, so that automatic pre-ionisation is achieved.

The discharge space is irradiated by the ultraviolet light generated by the pre-ionising discharge, causing initial-period electrons to be generated in the main discharge space. Then, when the voltage of secondary capacitors C2 reaches the discharge initiation voltage, the main discharge is generated between main electrodes 5, forming an inverted distribution in the laser medium and thereby generating laser oscillation.

Operation in which this process is repeated with a high repetition frequency of a few tens to a few hundred Hz is made possible by incorporating within laser chamber 4 a heat exchanger 7 and a blower 8 whereby forced convection and cooling of the gaseous laser medium (hereinbelow termed "laser gas") are achieved. Also, in order to stabilise the laser output during operation, output stabilisation control is performed by altering the charging voltage in accordance with the results of monitoring the laser output by an optical sensor, so that deterioration of the laser gas or contamination/damage of the window does not cause a drop in output.

There are obstacles to the successful implementation of a discharge switch Q exemplified by a thyratron used in a conventional laser device, since its durability may be impaired by consumption of the electrode due to evaporation or consumption of the heater etc. required for operation.

In more detail, as shown in FIG. 26, a large current i1 flows in the period where the conduction resistance R (turn-on resistance) is high during the process in which the thyratron Q shifts from the OFF condition to the ON condition. This therefore gives rise to a large thyratron loss (ohmic loss (i1)2.R, where (i1)2 indicates the square of i1) shown by the shading; it is believed that wear of thyratron Q occurs at the same time.

Accordingly, in order to suppress conduction current in the period directly after such switching in which there is a high turn-on resistance, a charging/discharging circuit is employed that uses a magnetic switch as saturable reactor. This technique is described for example in Hitachi Technical Reports vol. 8, 1992, 1 "Dynamic Characteristic of a Magnetic Switch Core for Pulse Power".

The saturable reactor that is employed as magnetic switch is an element that makes use of the saturation phenomenon of magnetic flux of magnetic material, and employs an insulated-layer Fe-based or Co-based amorphous wound magnetic core or Fe-based ultrafine crystalline magnetic alloy (trade name "FINEMET" manufactured by Hitachi Kinzoku) or the like for the magnetic core.

The operation when a magnetic pulse compression circuit of a typical circuit configuration in which a magnetic switch is employed is used as the pulse power source of a pulse laser will now be described with reference to FIG. 27.

In FIG. 27, the charge accumulated on capacitor C1 is transferred most efficiently to capacitor C3 when the design is such that the magnetic switch SR is saturated at the time-point where all the charge accumulated on capacitor C1 is transferred to C2 under the conditions C1≈C2≈C3. FIG. 28 shows the voltage and current waveforms at the principal locations when this condition is satisfied.

Let τ1 be the time that elapses before all of the charge accumulated on main capacitor C1 is transferred to capacitor C2 after main switch Q is turned ON. During the period τ1, the operating point of the magnetic core is in the unsaturated region on the loop of FIG. 23, and shifts with the passage of time from point a towards point b. The permeability μrs of the core of magnetic switch SR at this point is very high, so the inductance LSRu of the output winding N is much larger than inductance L1, with the result that scarcely any current can flow in output winding N. Magnetic switch SR consequently blocks the current during the voltage-time product indicated by the shaded portion of FIG. 28, and the following expression is established:

$$\int_0^{\tau_1} vsr \, dt = N \cdot Ae \cdot \Delta Bm \quad (1)$$

where vsr is the voltage applied to the magnetic core

N is the number of turns of the magnetic switch

Ae is the effective cross-sectional area of the core and ΔBm is the maximum operating magnetic flux density.

The time-width τ of the current pulse after turn-on is given by the following expression.

$$\tau = \pi(L1 C1 C2/(C1+C2)) \quad (2)$$

When the operating point of the core has moved to point d through point c after reaching point b on the loop in FIG. 23, the core is saturated, and the permeability μrs of the core is practically equal to the permeability μ0 of vacuum. The inductance LSRs is then much smaller than inductance L1, so practically all of the charge transferred to capacitor C2 is transferred to capacitor C3 with the pulse width τ2 shown in FIG. 28.

$$\tau 2 = \pi(LSRs \, C2C3/(C2+C3)) \quad (3)$$

When the direction of transfer current i2 is reversed, the operating point of the core is shifted from the point d on the loop of FIG. 23 towards point a, and is forcibly shifted towards point a. If we call the ratio of τ1 and τ2 the compression gain Gc, we have the following relationship:

$$Gc = \tau 1/\tau 2 = I2m/I1m \quad (4)$$

where I1m is the peak value of i1 and

I2m is the peak value of i2.

Thus, by using a magnetic pulse compression circuit, the pulse width and peak value of the current flowing through main switch Q are respectively multiplied by Gc and 1/Gc, compared with the case where such a circuit is not used. As a result, the switching loss of main switch Q can be lowered, and higher output and higher repetition rate can be achieved. Also, it becomes possible to employ a semiconductor switching element of larger maximum forward resistance and longer turn-off time than if a discharge switch such as a thyratron were employed. Furthermore, since the magnetic switch contains essentially no consumable parts, by combining it with a semiconductor switch, a pulse current source that does not require maintenance and is of exceptionally high durability can be implemented.

While a charging/discharging circuit employing a magnetic switch has the advantages described above, it is difficult to apply to an actual laser on account of the following substantial problems, and has not therefore been put into practice.

Specifically, the current blocking time τ1 of the compression element (saturable reactor) in a magnetic compression circuit as described above changes in response to the voltage vsr applied to the magnetic core as shown in equation (1) above. There was therefore the problem that, when control was performed to change the charging voltage, with the output of the laser beam being fed back as conventionally, this resulted in variation of the blocking time of the saturable reactor.

To explain this in a little more detail, in the case of a gas laser such as an excimer laser, with continued operation, there is a drop in oscillation efficiency and laser output due to the generation of gaseous impurities in the laser gas, consumption of gaseous components, and the light-extraction window becoming dirty. Conventionally therefore the output was stabilised by increasing the operating voltage (charging voltage) in order to obtain a fixed output by compensating for the output drop.

However, if a magnetic compression circuit is employed, when the operating voltage is increased, the current blocking time becomes shorter, resulting in the compression timing being displaced and adversely affecting the energy transfer efficiency: thus the laser output in fact falls. That is, if, as shown in FIG. 22, the maximum energy transfer efficiency is taken as ηmax, and the maximum value and minimum value of the voltage at which the efficiency is ½ of this are respectively Vmax and Vmin, practical utility as regards energy efficiency is practically entirely lost when this range Vm (Vmin to Vmax) is exceeded. There is therefore an optimum operating voltage range Vmin to Vmax, and voltage control must be exercised such that this voltage range is maintained. Putting this the other way round, voltage controllability is poor owing to the need to maintain a narrow voltage range; this therefore constituted an obstacle to the practical application of a charging/discharging circuit using a magnetic switch in a laser device.

With the foregoing in view, it is an object of the present invention to provide a device wherein, even when a charging/discharging circuit having a magnetic switch is applied in a discharge-excitation type laser device, compensation for laser output fluctuation can be performed with good controllability, and wherein control for laser output stabilisation can therefore easily be performed.

Discharge-excitation type laser devices have a wide range of applications as industrial light sources, and their charging/discharging circuitry has been the subject of various improvements aimed at improving durability.

However, as mentioned above, the problems that, with continued operation, gaseous impurities are generated due to electrode wear in the laser gas, the gaseous components are consumed, the light extraction window becomes dirty, oscillation efficiency falls, and laser output drops have still not been completely solved.

In particular, in the UV pre-ionisation system, in which pre-ionisation of the main discharge region is performed by generating UV rays by arc discharge, vigorous evaporation of the pre-ionisation electrode occurs due to the production of a hot spot at the root of the arc discharge on the electrode surface. This therefore tends to lower the durability of the component and to cause lowered laser oscillation efficiency. The amount of the evaporation at this pre-ionisation electrode depends greatly on the value of the current passing through the electrode.

Accordingly, as shown in Early Japanese Patent Publication No. H3-257980, in a conventional circuit, the main discharge capacitor and pre-ionisation discharge capacitor were connected in parallel and both were isolated, and the capacitance of the capacitor for pre-ionisation was adjusted to be as small as possible and the amount of electrode consumption thus limited. However, if the capacity of the pre-ionisation capacitor is made too small, problems occur such as an adverse effect on the main discharge, lowered laser output, and instability of the discharge. That is, there were limits to the extent to which the amount of electrode consumption could be reduced simply by adjusting the capacitance of the capacitor.

With the foregoing in view, it is a second object of the present invention to provide a charging/discharging device wherein the value of the current passing through the pre-ionisation electrodes can be made small, durability of the electrodes thereby increased and drop in laser output prevented.

DISCLOSURE OF THE INVENTION

A first object of the present invention to provide a device wherein, even when a charging/discharging circuit having a magnetic switch is applied in a discharge-excitation type laser device, compensation for laser output fluctuation can be performed with good controllability, and wherein control for laser output stabilisation can therefore easily be performed.

This first object is achieved by the following construction.

Specifically, according to a first aspect of this invention there is provided a discharge-excitation type laser device comprising a charging/discharging circuit having a power source, a main switch that applies the voltage of this power source to the discharge electrodes, and a magnetic switch, provided between this main switch and the discharge electrodes, that blocks, for a period of time dependent on the magnitude of the voltage of the power source, the current flowing from the power source to the discharge electrodes, laser light oscillation and output being achieved by supplying laser gas into a laser chamber where the discharge electrodes are arranged and exciting the laser gas by discharge between the discharge electrodes comprising: output detection means that detects the output of the laser light; and control means that, if it is detected that the output of the laser light detected by the output detection means departs from a target value or a target range, changes the voltage of the power source within a fixed range and controls the amount of laser gas supplied to the laser chamber or the amount of laser gas evacuated from the laser chamber such that the output of the laser light coincides with the target value or comes within the target range.

The output detection means may detect the optical output directly or may detect the optical output indirectly by detecting a parameter associated with the optical output, such as the concentration of halogen gas or rare gas concentration.

With the construction of the first aspect of the present invention, if it is detected that the output of the laser light detected by the output detection means departs from a target value or a target range, whilst keeping the power source voltage within a fixed range, the amount of laser gas supplied to the laser chamber or the amount of laser gas evacuated from the laser chamber is controlled such that the output of the laser light coincides with the target value or comes within the target range. In this way, fluctuation of laser output can be compensated with good controllability by controlling only the laser gas supply/evacuation amount, without accompanying voltage control.

A second object of the present invention to provide a charging/discharging device wherein the value of the current passing through the pre-ionisation electrodes can be made small, durability of the electrodes thereby increased and drop in laser output prevented.

This second object is achieved by the second and third aspects of the present invention as described below.

Specifically, according to the second aspect of the present invention there is provided a charging/discharging device for a discharge-excitation type laser device comprising a charging/discharging device having a power source, a main switch that applies the voltage of the power source to pre-ionisation electrodes and main discharge electrodes, and a plurality of capacitor stages, provided between the main switch and the pre-ionisation electrodes and main discharge electrodes, wherein, by actuation of the main switch, the charge accumulated on the first-stage capacitor by the power source is moved to the second and subsequent-stage capacitors, effecting pre-ionisation discharge between the pre-ionisation discharge electrodes and main discharge between the main discharge electrodes in accordance with the accumulated charge of the last-stage capacitor, the laser gas being excited by the main discharge between the main discharge electrodes, producing laser light oscillation, which is output; wherein: there is provided a pulse transformer whose primary winding is connected in series with the first-stage capacitor and whose secondary winding is connected in series with the second-stage capacitor, and which steps up in voltage a pulse current discharged from the first-stage capacitor and charges the second-stage capacitor; and wherein: a magnetic switch that blocks current discharged from the second-stage capacitor is connected at the downstream side of the second capacitor, the pre-ionisation electrodes being connected in series with the magnetic switch; the second-stage capacitor and secondary winding, the magnetic switch and the pre-ionisation electrodes, and a third-stage capacitor of the final stage and the main discharge electrodes being respectively connected in parallel.

According to a third aspect of the present invention, in a charging/discharging device constructed in this way, the primary winding of a pulse transformer is connected in series with the first-stage capacitor and the secondary winding of the pulse transformer is divided into two i.e. first and second windings, a pre-ionisation discharge circuit comprising the first winding and the second-stage capacitor for the pre-ionisation electrodes and a main discharge circuit comprising the second winding and a second-stage capacitor for the main discharge electrodes being isolated.

With the construction of the second aspect of the present invention, the second-stage capacitor is charged up by stepping up a pulse current discharge from the first-stage capacitor by means of the pulse transformer. At this point, the magnetic switch that is connected to the downstream side of the second-stage capacitor assumes a saturated condition i.e. a conductive condition and current is passed through the pre-ionisation electrodes which are connected in series with the magnetic switch. The current that is passed is the charging current for pulse charging of the second-stage capacitor, which constitutes an accumulation capacitor; its peak value is small.

From the time-point when movement of charge to the second-stage capacitor has been completed, discharge current in the reverse direction tries to flow in the second-stage capacitor, but the magnetic switch acts to block the reverse-direction current, stopping pre-ionisation discharge. Simultaneously with this, the core of the pulse transformer is saturated, with the result that movement of charge from the second-stage capacitor to the third-stage i.e. the final-stage capacitor, which is a peaking capacitor, is commenced. The voltage of the peaking capacitor rises until the discharge initiation voltage is reached, whereupon laser oscillation is performed. In this way the current passing through the pre-ionisation electrodes is small, and the pre-ionisation discharge is quickly terminated by the action of the magnetic switch, shifting to the main discharge. Consequently, the wear of the pre-ionisation electrodes is reduced.

Also, with the construction of the third aspect of this invention, the pulse current that is discharged from the first-stage capacitor is stepped up into voltage by the pulse transformer before being charged onto the second-stage capacitor for the pre-ionisation electrodes, and the charging current then passes through the pre-ionisation electrodes. Thus the current which is passed is the charging current on pulse charging and its peak value is small.

Also, the pre-ionisation discharge-excitation circuit and the main discharge-excitation circuit are separated and independent, so the discharge timing of the pre-ionisation electrodes can be adjusted without affecting the discharge timing of the main discharge electrodes, so laser oscillation can be performed in a stable manner.

Thus the value of the current passing through the pre-ionisation electrodes is small and the timing of the pre-ionisation discharge can be optimally adjusted so the wear on the pre-ionisation electrodes can be reduced, thereby enabling laser oscillation to be performed in a stable manner.

BRIEF DESCRIPTION OF THE DRAWINGS

FIG. 15 is a view showing an equivalent circuit of the first constructional example;

FIG. 16 is a view showing an equivalent circuit of the second constructional example;

FIG. 19 is a view showing an equivalent circuit of the third constructional example;

FIG. 20 is a view showing an equivalent circuit of the fourth constructional example;

BEST MODE FOR CARRYING OUT THE INVENTION

An embodiment of a laser gas controller for a discharge-excitation type laser device according to a first aspect of the present invention will now be described with reference to the drawings.

First embodiment

Figure 1:
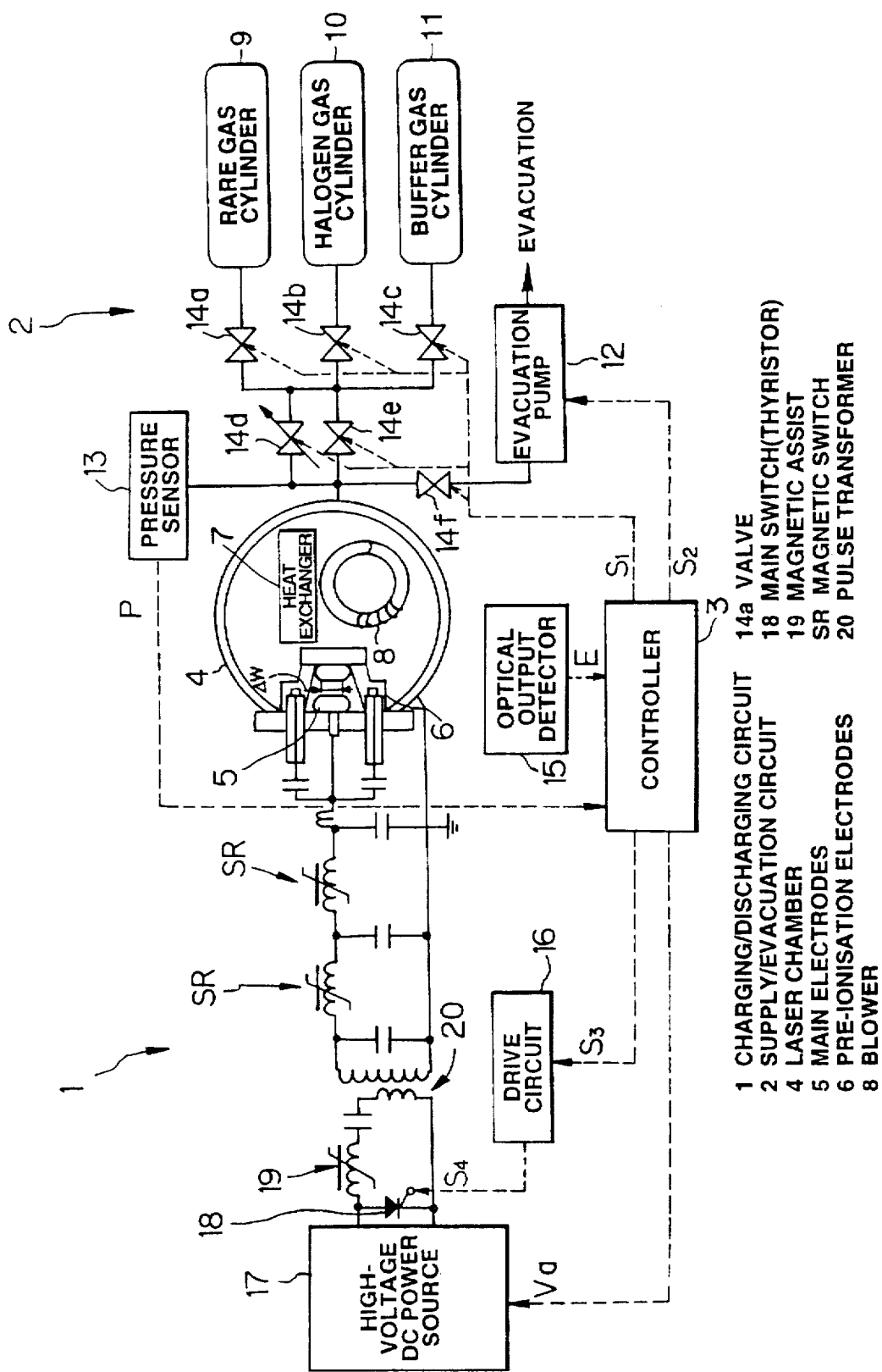
FIG. 1 is a view showing the construction of a first embodiment of a laser gas controller for a discharge-excitation type laser device according to a first aspect of the present invention.

FIG. 1 shows the construction of a laser device in a first embodiment. Structural elements which are the same as in the conventional device are given the same reference symbols and further description thereof is omitted.

Figure 10:
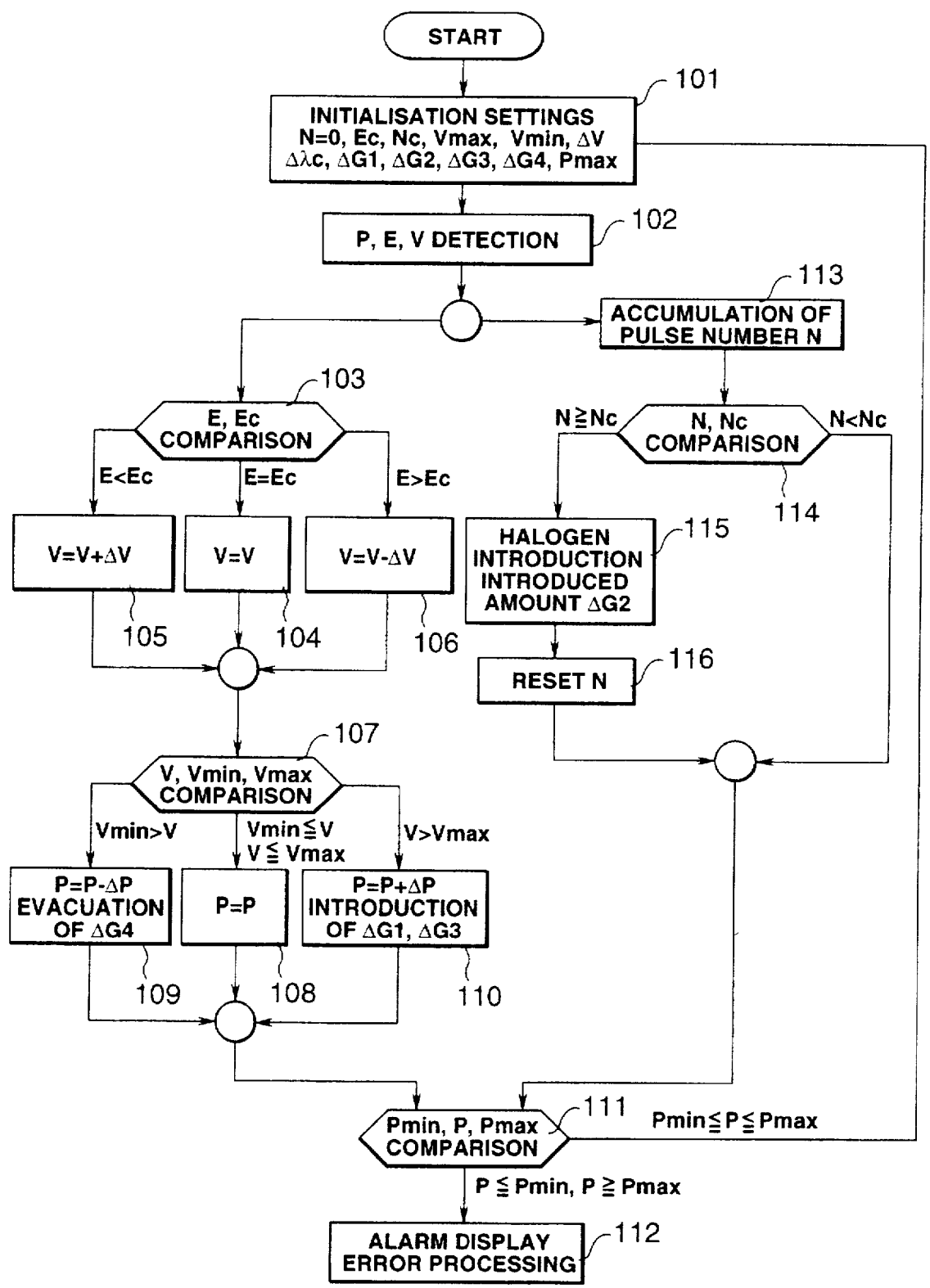
FIG. 10 is a flow chart showing the processing sequence of the first to seventh embodiments.

As shown in this Figure, in outline the device of this embodiment comprises a charging/discharging circuit 1 whereby discharge is effected between main electrodes 5,5 a laser chamber 4 that is supplied and filled with laser gas and wherein oscillation of laser light La is produced by excitation of the laser gas by discharge between main electrodes 5,5, a supply/evacuation circuit 2 whereby laser gas is supplied into laser chamber 4 and laser gas is exhausted from chamber 4, and a controller 3, to be described, which, as shown in FIG. 10, controls charging/discharging circuit 1 and supply/evacuation circuit 2 in accordance with the output etc. of pressure sensor 13.

In more detail, rare gas cylinder 9 is filled with rare gas (Xe, Kr, Ar etc.), halogen gas cylinder 10 is filled with halogen gas (F2, Hcl etc. diluted by buffer gas), and buffer gas cylinder 11 is filled with buffer gas (He, Ne etc.). Piping, on which are disposed valves 14a to 14f and evacuation pump 12, is provided between cylinders 9, 10, 11 and laser chamber 4; valve opening and closing signals S1 are output from controller 3 to valves 14a to 14f and a pump drive signal S2 is output to evacuation pump 12, thus controlling the supply of laser gas into laser chamber 4 and evacuation of gas from chamber 4.

Pressure sensor 13 detects the gas pressure P in laser chamber 4 and its detection output P is input to controller 3.

The light generated by the discharge and excitation of the laser gas within laser chamber 4 is made to resonate by a resonator, not shown, thereby performing laser oscillation. The oscillating laser light La is output through a window and front mirror etc., not shown.

The laser light La that is output is input to optical output detector 15, and the laser output E is detected by the optical output detector 15, the detection output E being input to controller 3. Optical output detector 15 detects part of the laser output by holding the peak value of for example a PIN photodiode. Optical output detector 15 could be a detector that detects the optical output directly, or could be a detector that detects the optical output indirectly by detecting a parameter associated with the optical output, such as the halogen gas concentration or rare gas concentration.

Furthermore, there is provided a counter (not shown) that, every time light is detected by optical output detector 15, counts this. The number of oscillation pulses N of laser light La is counted by the counter and the output N of the counter is input to controller 3.

Charging/discharging circuit 1 effects discharge between main electrodes 5,5, its drive source being provided by high voltage DC power source 17. The charging voltage V of the power source 17 is detected by a voltage detector, not shown, and input to controller 3.

Controller 3 outputs a command voltage Va to power source 17 based on laser output E detected by optical output detector 15, gas pressure P detected by pressure sensor 13, count N detected by the pulse counter, and charging voltage V of power source 17 detected by the voltage detector, thereby controlling the charging voltage such that the charging voltage V of the power source 17 is the instructed voltage value Va.

Charging/discharging circuit 1 is actuated by the turning ON of a thyristor 18 constituting a main switch, to which is attached a magnetic assist 19. Controller 3 sends a drive signal S3 for driving charging/discharging circuit 1 to drive circuit 16, and, in response to the, drive circuit 16 applies an ON signal S4 to main switch 18, thereby actuating charging/discharging circuit 1.

A thyristor is employed for main switch 18, but other semiconductor switches such as for example a GTO or IGBT could be employed.

Charging/discharging circuit 1 is of a circuit construction equipped with a two-stage magnetic compression circuit comprising a pulse transformer 20 i.e. it is equipped with two magnetic switches SR.

When operation of the laser device is commenced, first of all, the old gas in laser chamber 4 is evacuated by performing evacuation to the prescribed gas pressure by means of the vacuum pump. Next, by opening and closing valves 14a . . . as required, rare gas, halogen gas and buffer gas are respectively successively introduced until the output P of pressure sensor 13 reaches the prescribed set value. When the laser gas is thus introduced into chamber 4, sequential control involving actuation of blower 8 for gas circulation within chamber 4 and warm-up of power source 17 is then successively performed, to achieve a condition in which operation of the laser device is possible.

At this point, prior to operation of the laser device, first of all, as shown in step 101 of FIG. 10, the target laser output Ec, the pulse number interval Nc for halogen gas introduction, the amount of change of the charging voltage ΔV, the amount of the first replenishment of rare gas ΔG1, the amount of the first replenishment of halogen gas ΔG2, the amount of the first replenishment of buffer gas ΔG3 and the amount of the first evacuation of evacuated gas ΔG4, and the limiting gas pressures (Vmax, Vmin) are preset, and resetting (N=0) of the pulse number counter is performed.

After this, when operation of the laser device is commenced, the laser output E detected by optical output detector 15, the chamber pressure P detected by pressure sensor 13, and the charging voltage V detected by a voltage detector are successively input to controller 3. However, charging voltage V may be represented by the command voltage Va (step 102).

Controller 3 compares the detected laser output E with target laser output Ec (step 103). If E<Ec, it increases the charging voltage V by the minute voltage ΔV and takes the result as command charging voltage Va (step 105). If E=Ec, it takes the detected voltage V as the command charging voltage Va without altering it (step 104). If E>Ec, it decreases the detected charging voltage V by minute voltage ΔV and makes the result the command charging voltage Va (step 106).

In general, when control to approach a target value is formed, a don't care zone is provided because of considerations regarding detector resolution and various kinds of noise. The target laser output Ec may therefore have a certain width. That is, a target range is set, and control is exercised such that the laser output comes within this target range.

Furthermore, controller 3 compares command charging voltage Va (current charging voltage V) with the maximum value Vmax and the minimum value Vmin of the charging voltage control range Vm (step 107). If Va≦Vmax and Va≧Vmin, it goes on to the next step 111 with the gas pressure P maintained at the current pressure (step 108).

However, if command charging voltage Va is Va>Vmax, processing is performed to replenish the gas within laser chamber 4 from rare gas cylinder 9 and buffer gas cylinder 11 by a prescribed amount of rare gas ΔG1 and a prescribed amount of buffer gas ΔG3; after the gas pressure has been increased by a minute amount ΔP, the program goes to step 111 (step 110). Also, if Va<Vmin, processing is performed to evacuate laser gas within laser chamber 4 by a prescribed amount ΔG4, thereby decreasing the gas pressure P by the minute amount ΔP, before going to step 111 (step 109).

Since usually the laser output tends to fall due to generation of gaseous impurities and the window etc. becoming dirty or damaged, the total pressure rises with gas replenishment, so an evacuation process can often be dispensed with. The processing of step 109 may therefore be dispensed with.

Control for replenishment of halogen gas is also performed during operation of the laser device (steps 113 to 116).

More specifically, during operation of the laser device, the amount of halogen gas is decreased by reaction with electrode evaporation products etc., the amount of this decrease being proportional to the operating time i.e. to the operating pulse number N. Accordingly, in order to replenish the halogen gas by an amount proportional to the operating pulse number N, halogen gas is replenished by a prescribed amount ΔG2 every time the count pulse number N reaches a prescribed value Nc. At the time-point where the replenishment of halogen gas is performed, the count value N is reset to zero, and the program goes to step 111 constituting the subsequent processing (steps 114, 115, 116). In this embodiment the number of pulses N was found by counting the detection signal of optical output detector 15, but it would be possible to find this by counting the trigger pulses (which represent the oscillation command).

In step 111, a decision is made as to whether the gas pressure P in laser chamber 4 is within the prescribed range Pmin≦P≦Pmax; since, if the pressure range is exceeded, it is difficult to maintain the laser output E, abnormality processing is performed such as output of a service request signal for gas replacement or for replacement of defective components etc., to be performed, or a required alarm indication or error processing to be carried out (step 112). Although in this embodiment the charging voltage V was controlled so as to come within the charging voltage control range Vm, it would be possible to leave the charging voltage at a fixed value and to effect gas supply/evacuation control of the laser gas.

In this case, subsequent to the processing of step 103, the processing of steps 108 to 110 is performed (instead of the processing of steps 104 to 106), and the program then goes to step 111.

Specifically, controller 3 compares the detected laser output E with the target laser output Ec (step 103). If E<Ec, it performs processing to evacuate laser gas in laser chamber 4 by a prescribed amount ΔG4 (step 109). If E=Ec, it maintains the gas pressure P at the current pressure (step 108). If E>Ec, it performs processing to replenish the gas in the laser chamber 4 with a prescribed amount of rare gas ΔG1 and buffer gas ΔG3 from rare gas cylinder 9 and buffer gas cylinder 11 (step 110).

Also, although, in this embodiment, processing was performed to replenish the halogen gas periodically (steps 113 to 116), depending on the circumstances, this could be omitted. Also, in step 110, the replenishment of halogen gas could be combined with replenishment of another rare gas or buffer gas.

Also, although, in this embodiment, the charging voltage V was detected directly, since the charging voltage V and beam width Δw of the laser light La are in practically proportional relationship, the charging voltage V could be detected by detecting the beam width Δw. In this connection, the beam width Δw means the width in the direction perpendicular to the discharge direction between main electrodes 5,5 as shown in FIG. 1; this can be detected by directing the laser beam on to a line sensor.

Also, since the relationship between the charging voltage B and the spectral bandwidth Δλ e.g. the half-width in the spectral distribution of the frequency of the laser light La is a practically proportional relationship, by detecting the spectral width Δλ, the charging voltage V can be detected.

Embodiments are also possible in which charging/discharging circuits 1 as shown in FIG. 2 to FIG. 7 are employed instead of the charging/discharging circuit 1 shown in the first embodiment described above FIG. 2 to FIG. 7 are employed instead of the charging/discharging circuit 1 shown in the first embodiment described above.

Figure 2:
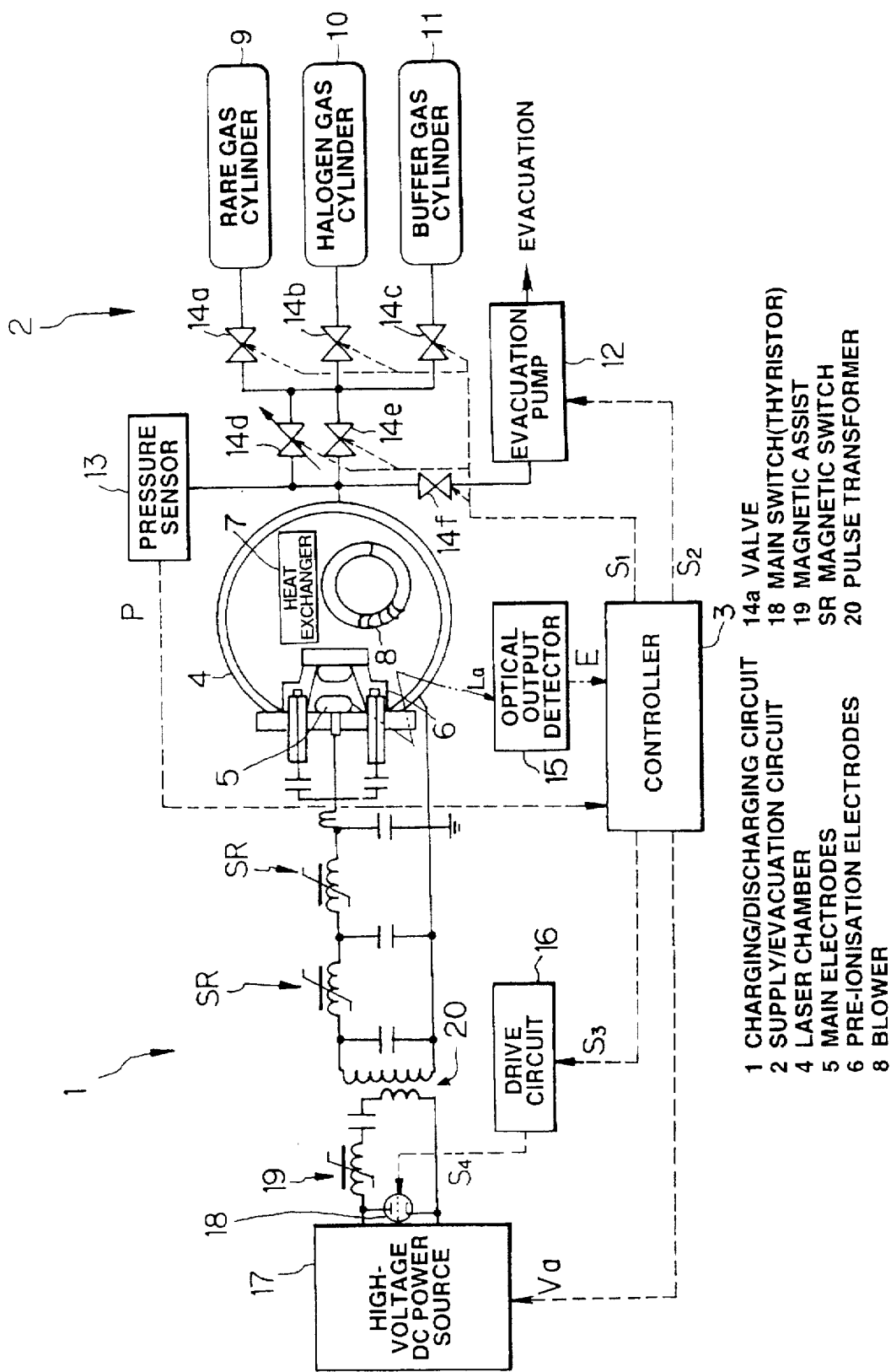
FIG. 2 is a view showing the construction of a second embodiment of the laser gas controller.

FIG. 2 shows a second embodiment in which a two-stage magnetic compression circuit employing a thyratron 18' is adopted as the main switch.

Figure 3:
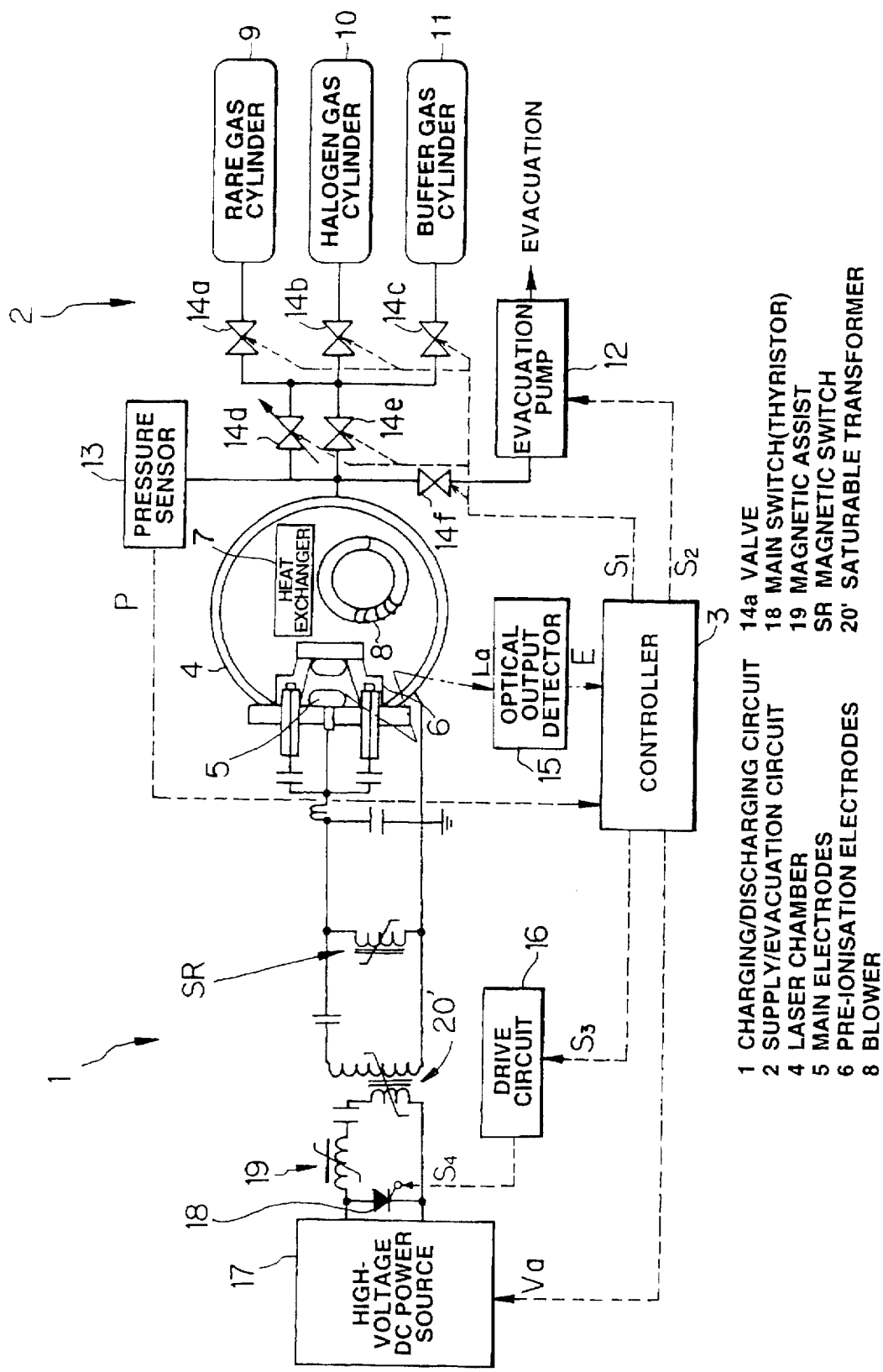
FIG. 3 is a view showing the construction of a third embodiment of the laser gas controller.

FIG. 3 shows a third embodiment in which a magnetic compression circuit employing a saturable transformer 20' is adopted instead of pulse transformer 20.

Figure 4:
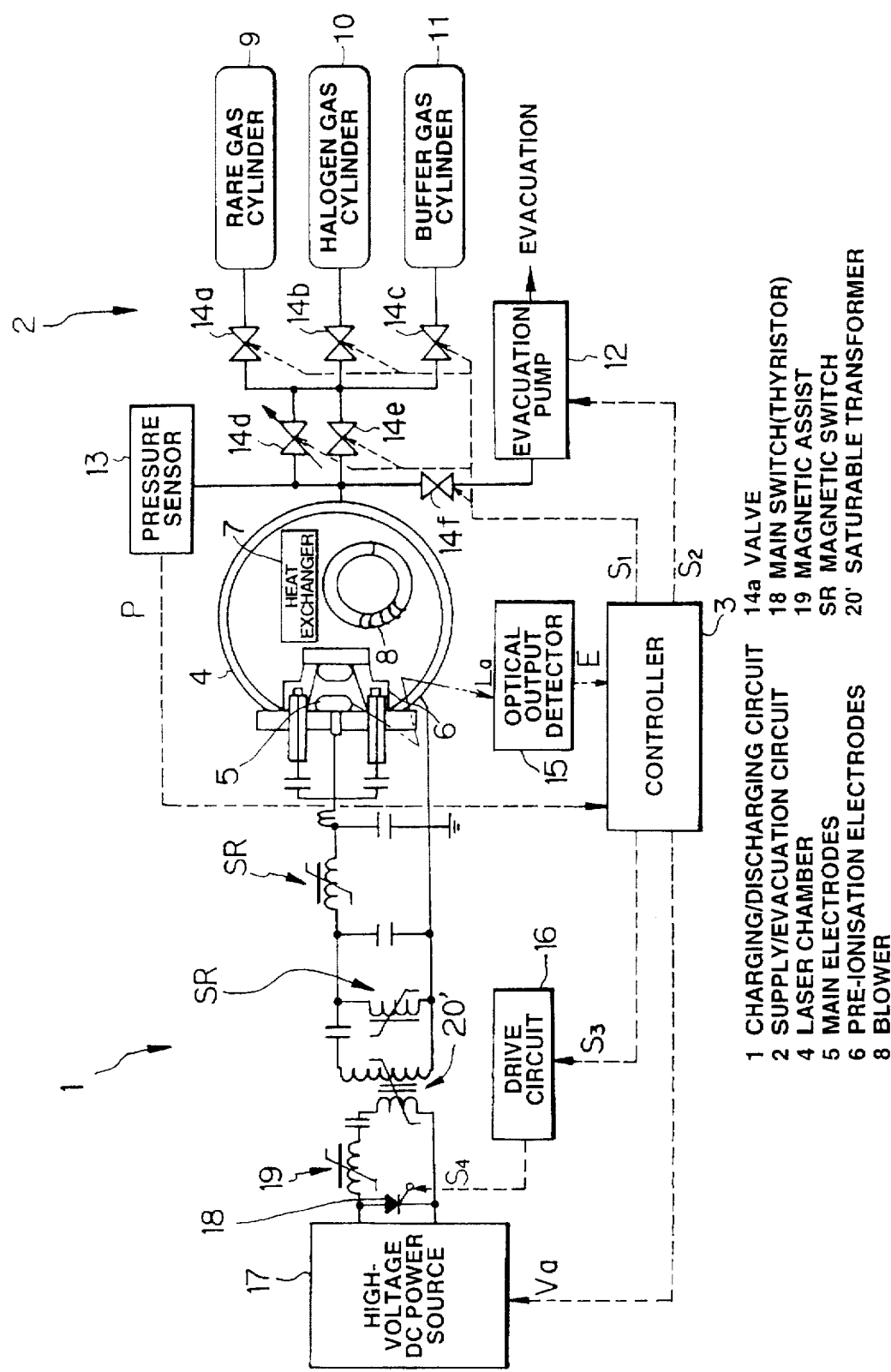
FIG. 4 is a view showing the construction of a fourth embodiment of the laser gas controller.
Figure 5:
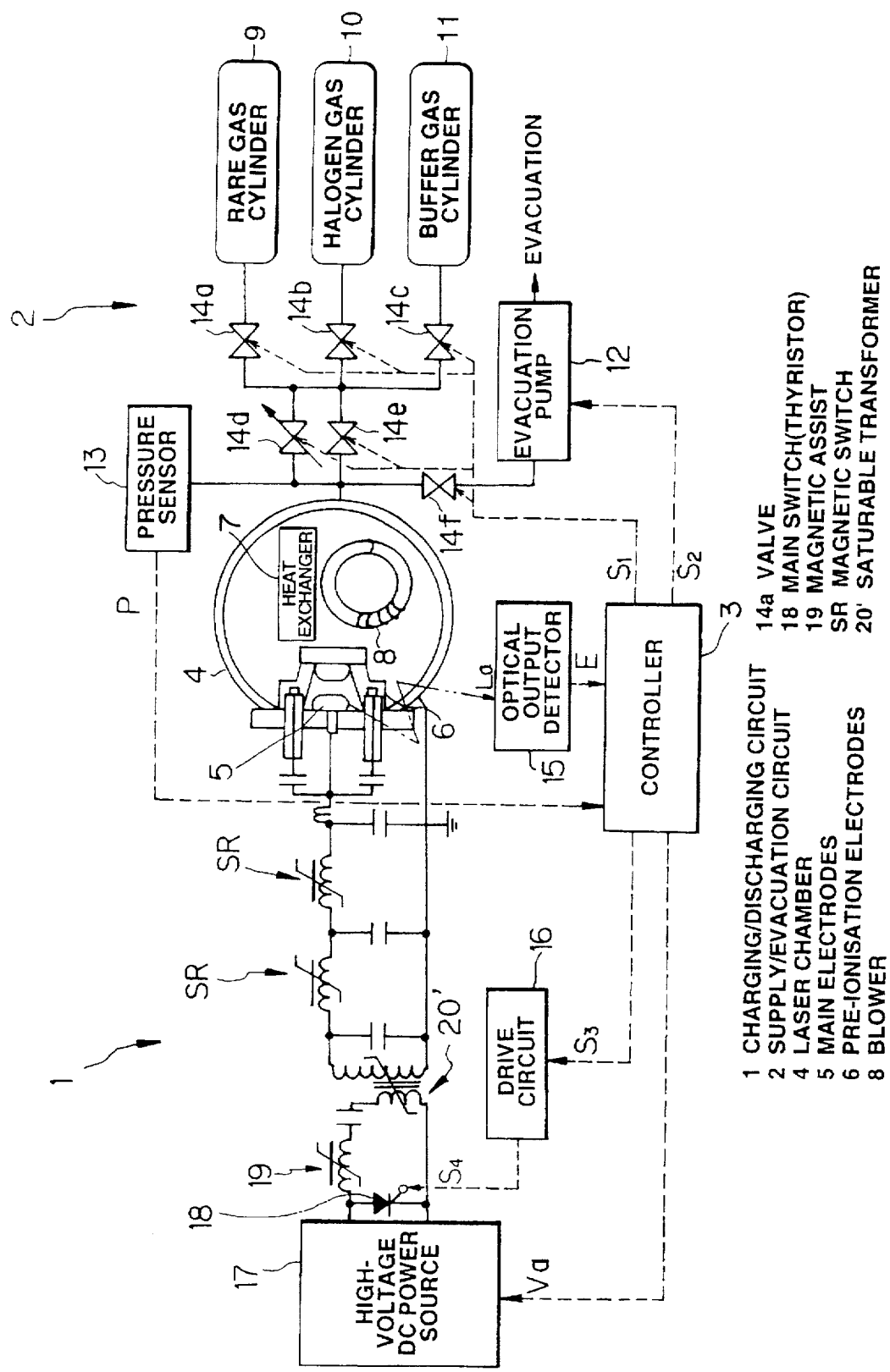
FIG. 5 is a view showing a fifth embodiment of the laser gas controller.

FIG. 4 and FIG. 5 show a fourth and a fifth embodiment in which respectively a single-stage and two-stage magnetic compression circuit are adopted for the magnetic compression circuit employing saturable transformer 20'.

Figure 6:
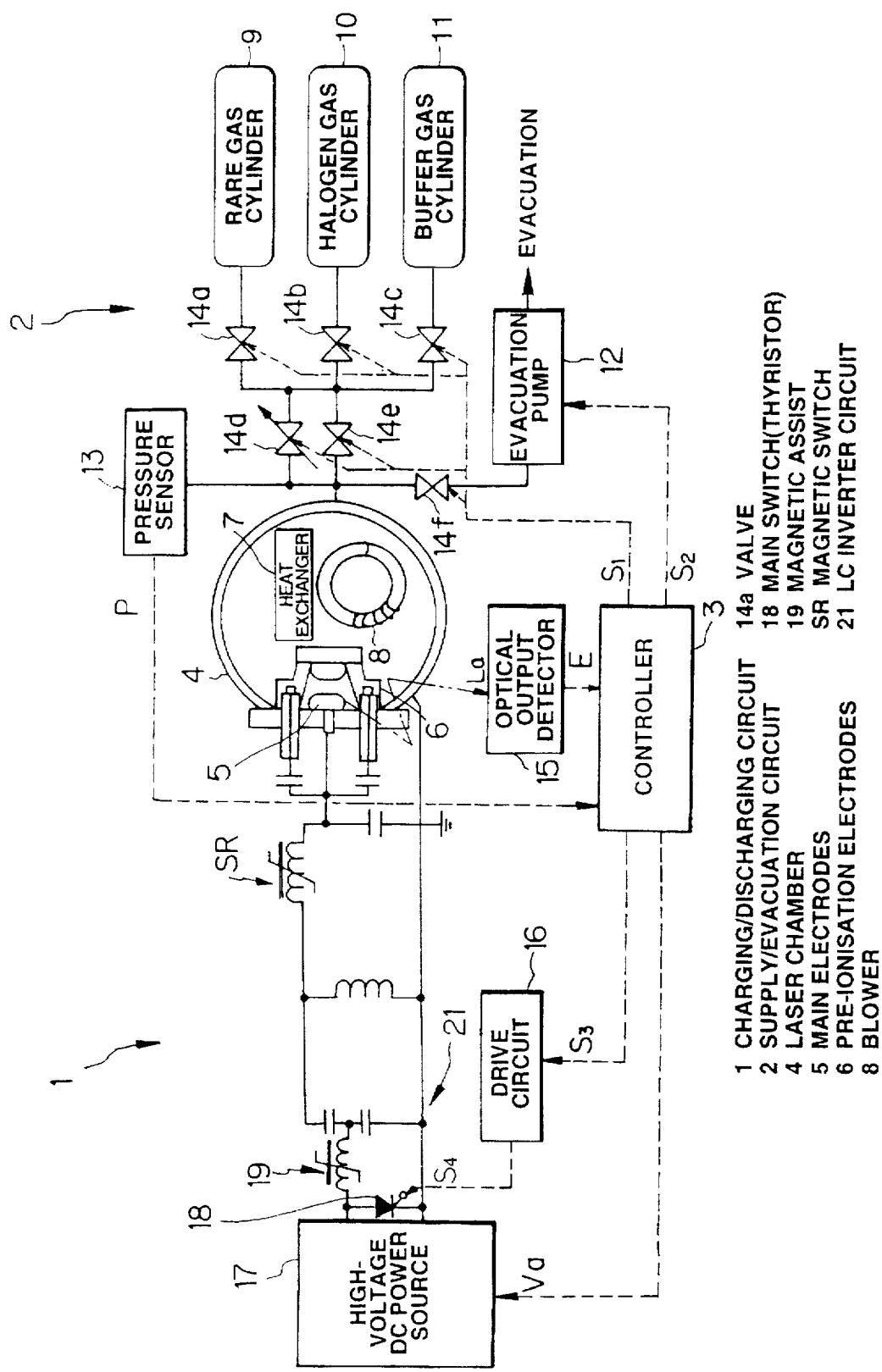
FIG. 6 is a view showing a sixth embodiment of the laser gas controller.

FIG. 6 shows a sixth embodiment, in which a single-stage magnetic compression circuit is added to the voltage-doubling circuit 21 based on LC inversion.

Figure 7:
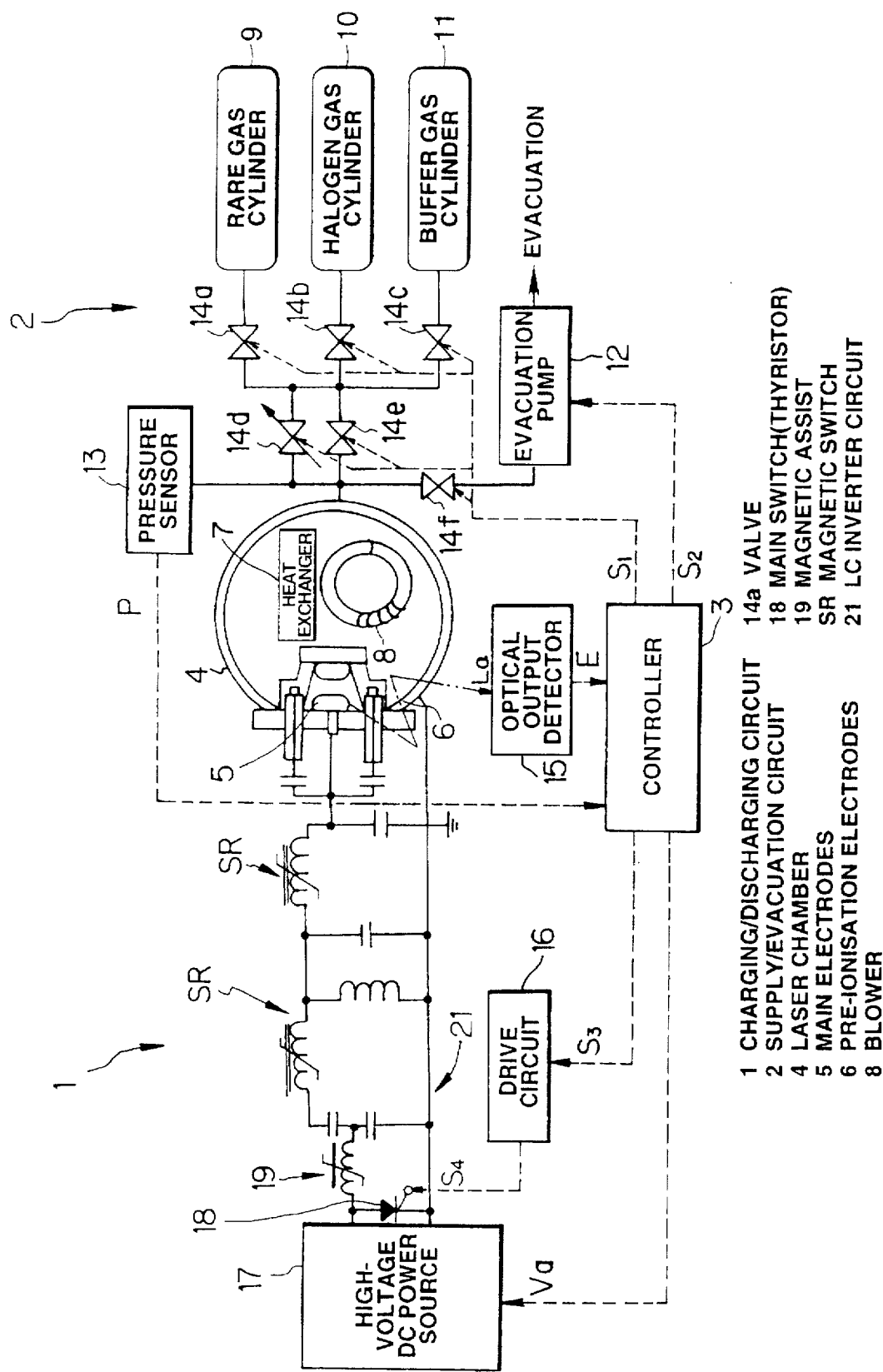
FIG. 7 is a view showing a seventh embodiment of the laser gas controller.

FIG. 7 shows a seventh embodiment in which, further, there is added a two-stage magnetic compression circuit to voltage doubling circuit 21 based on LC inversion.

Figure 8:
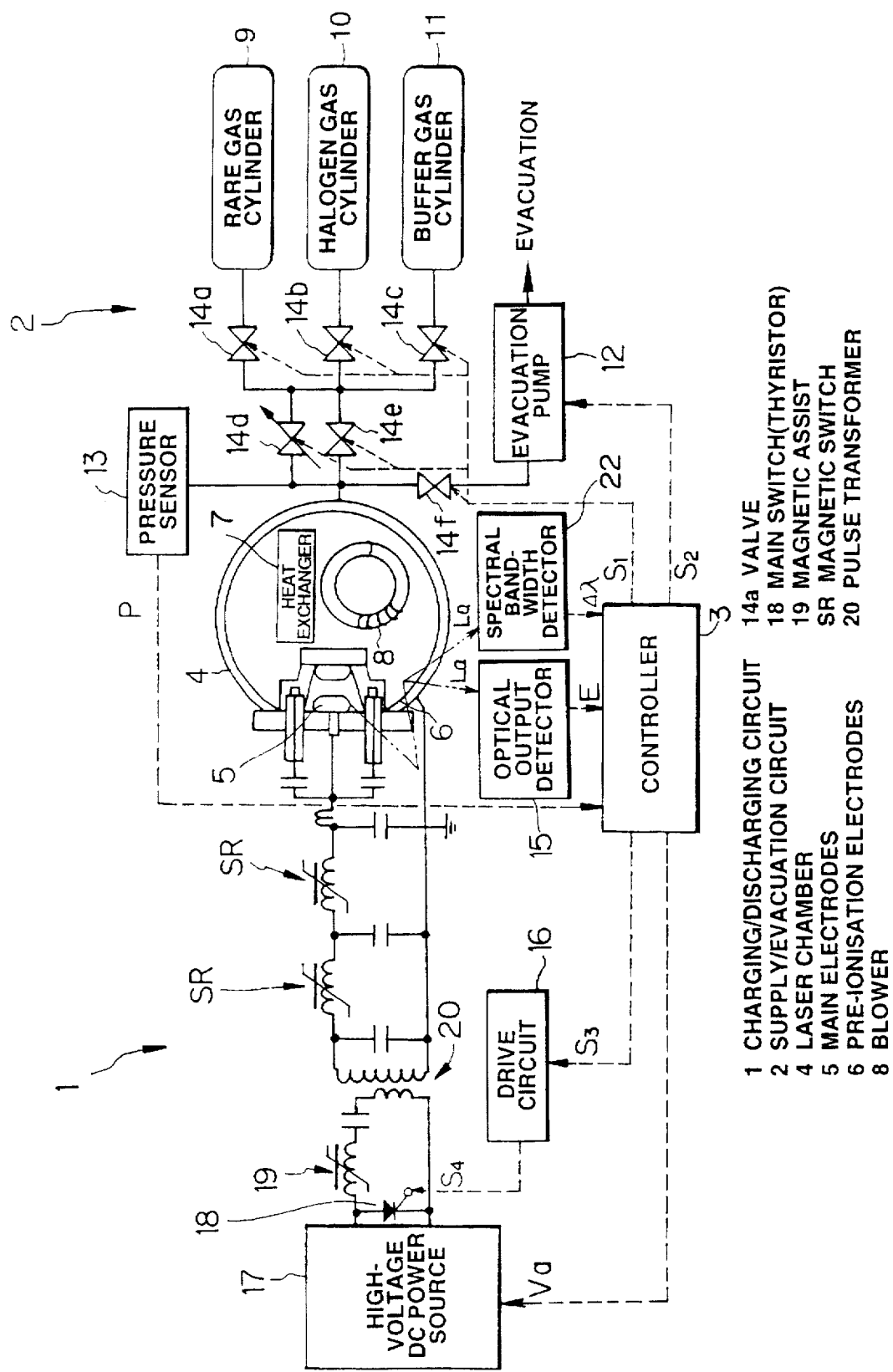
FIG. 8 is a view showing an eighth embodiment of the laser gas controller.
Figure 11:
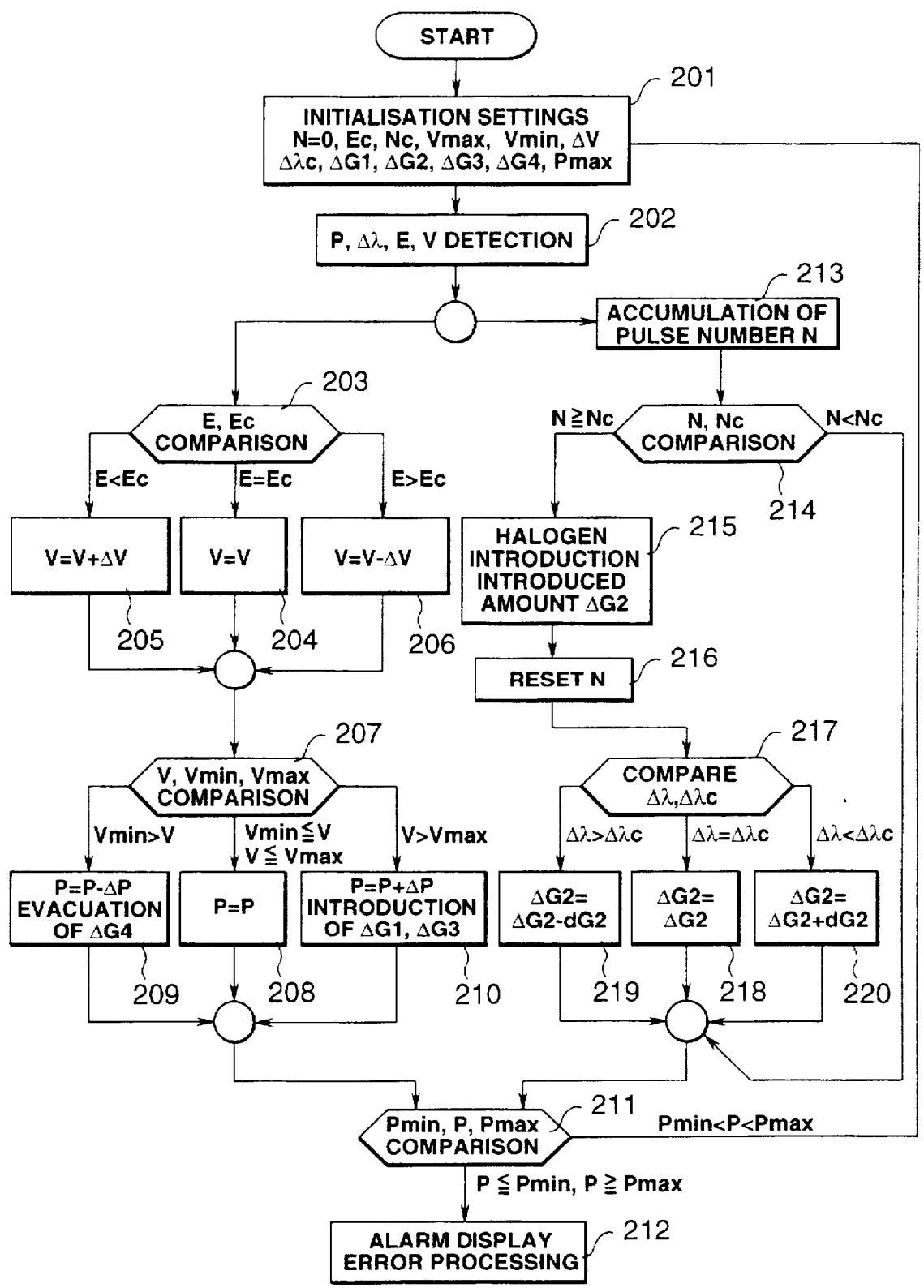
FIG. 11 is a flow chart showing the processing sequence of the eighth embodiment.

FIG. 8 shows the layout of a device according to an eighth embodiment employing a charging/discharging circuit 1 of the same circuit construction as in FIG. 1, the difference from FIG. 1 being that there is added a spectral bandwidth detector 22 that detects the spectral bandwidth Δλ (for example the half-width) in the spectral distribution of the frequency of the laser light La. The detected output Δλ of spectral bandwidth detector 22 is input to controller 3, where the processing shown in FIG. 11 is performed.

The details of the processing performed by controller 3 will now be described with reference to FIG. 11. Description of aspects of processing that are the same as the processing of FIG. 10 is omitted.

First of all, in step 201, processing just as in the case of step 101 described above is executed, and setting of target spectral bandwidth Δλc is also concurrently performed.

Next, in step 202, processing identical with that of step 102 described above is executed and the spectral bandwidths Δλ detected by spectral bandwidth detector 22 are successively input to controller 3 (step 202).

Then, in step 203 to step 210, identically with step 103 to step 110, charging voltage control and gas supply/evacuation control are executed. Also, in step 213 to step 216, identically with step 113 to step 116, periodical replenishment processing of halogen gas is executed.

Then, in step 217 to step 220 after the completion of halogen gas replenishment processing, spectral bandwidth stabilisation processing is executed.

An excimer laser of reduced bandwidth employing an angular dispersion type bandwidth reduction element has a spectral profile dependent on laser gain distribution in the dispersion angle direction i.e. it has the property of variation of spectral bandwidth. The strong dependence of laser gas composition, in particular partial pressure of the halogen gas and spectral profile has already been disclosed in earlier patent applications by the present inventors (Japanese patent application H4-312202 etc.). Accordingly, in the eighth embodiment, the halogen partial pressure is stabilised, thereby stabilising the spectral bandwidth Δλ, by increasing or decreasing the amount of replenishment ΔG2 of halogen gas in response to the output of spectral bandwidth detector 22.

First of all, the detected spectral bandwidth Δλ is compared with the target spectral bandwidth Δλc (step 217). If Δλ<Δλc, the replenishment amount ΔG2 is updated (step 220) with the halogen gas replenishment amount ΔG2 increased by a minute amount dG2. If Δλ=Δλc, the updating is effected (step 218) with the current replenishment amount ΔG2 left unchanged i.e. without increasing or decreasing the current halogen gas replenishment amount ΔG2. If Δλ>Δλc, updating of the replenishment amount ΔG2 is performed (step 219) with the halogen gas replenishment amount ΔG2 decreased by a minute amount dG2. After this, the procedure goes to step 211, and gas pressure comparison processing and abnormality processing are executed in the same way as in steps 111 and 112 described above (steps 211, 212).

Figure 9:
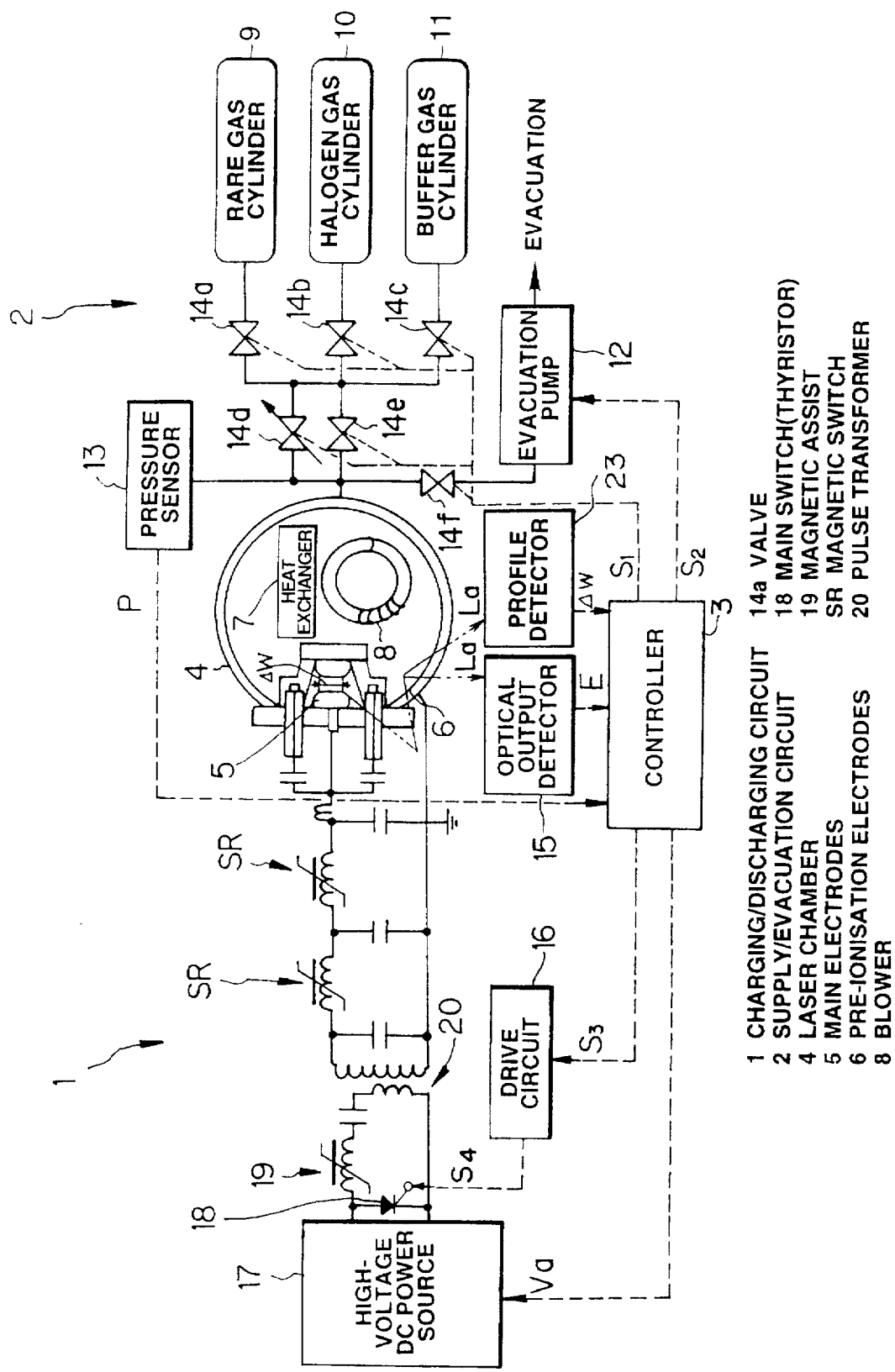
FIG. 9 is a view showing a ninth embodiment of the laser gas controller.
Figure 12:
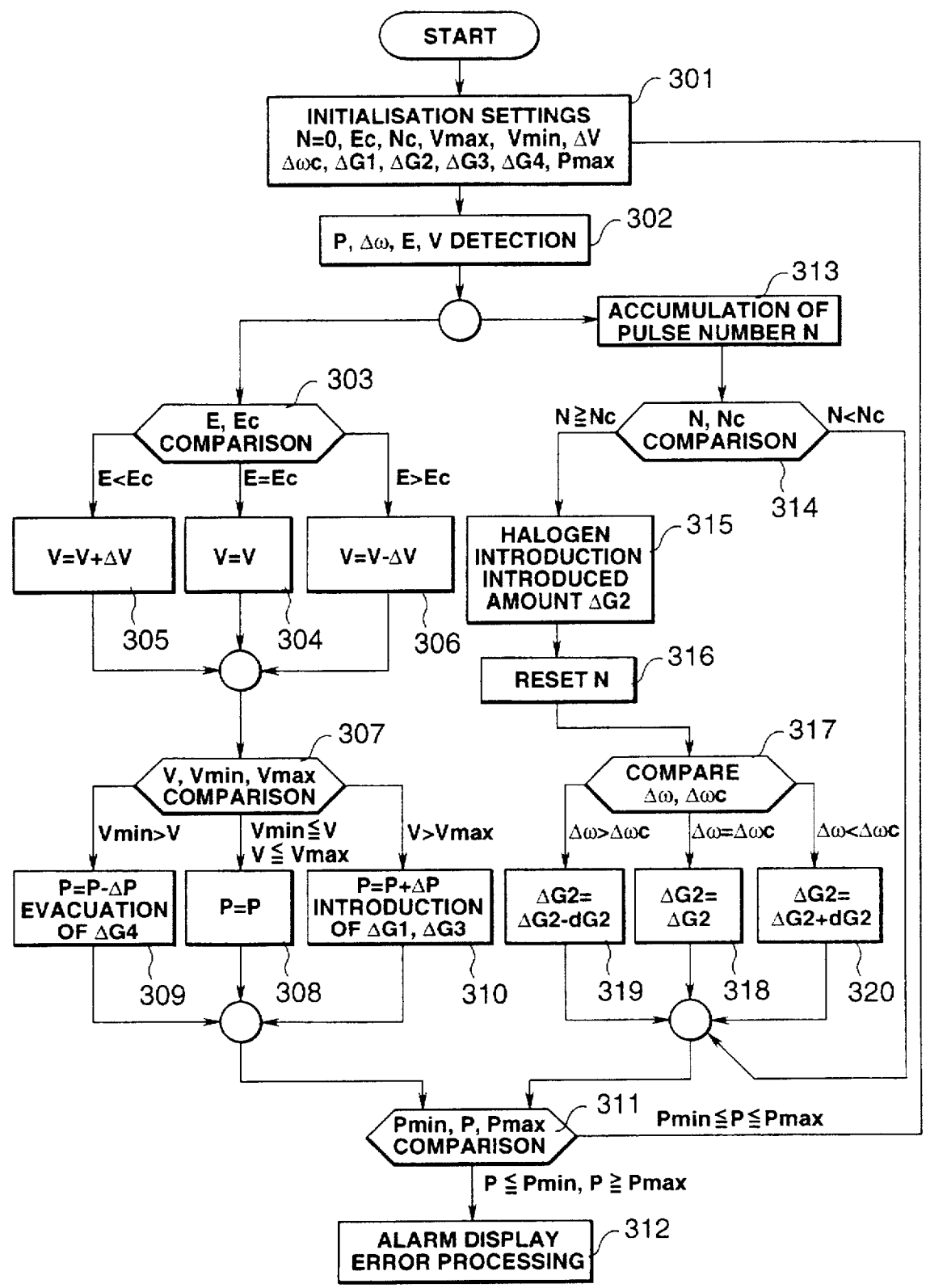
FIG. 12 is a flow chart showing the processing sequence of the ninth embodiment.

FIG. 9 shows the construction of a device according to a ninth embodiment, in which a charging/discharging circuit 1 which is of the same circuit construction as FIG. 1 is employed, the only point of difference from FIG. 1 being that there is added a beam profile detector 23 that detects the beam width Δw in the direction perpendicular to the direction of discharge between main electrodes 5,5. The beam profile detector 23 detects the beam width Δw by directing the laser light La on to a line sensor. The detection output Δw of profile detector 23 is input to controller 3, where the processing illustrated in FIG. 12 is performed.

The details of the processing performed in controller 3 will now be described with reference to FIG. 12. Aspects of the processing that are the same as the processing of FIG. 10 are omitted in the description.

First of all, in step 301, processing identical with that of step 101 above is executed, and setting of the target beam width Δwc is concurrently performed.

Next, in step 302, processing identical with that of step 102 above is executed, and the beam widths Δw detected by beam width detector 23 are successively input to controller 3 (step 302).

Then, in step 303 to step 310, charging voltage control and gas supply/evacuation control are executed just as in step 103 to step 110 above. Also, in step 313 to step 316, periodic halogen gas replenishment processing is executed just as in step 113 to step 116 above.

Thus, in step 317 to step 320 after completion of halogen gas replenishment gas processing, beam width stabilisation control is executed.

In more detail, an excimer laser has the characteristic that the beam profile i.e. beam width Δw varies depending on the laser gain distribution. The strong dependence of beam profile on gas composition, in particular the partial pressure of the halogen gas, was discovered by the present inventors and is indicated in Japanese patent application number H6-73389 already applied for.

Stabilisation of beam width i.e. stabilisation of the profile can therefore be achieved by stabilising the halogen gas partial pressure by increasing or decreasing the replenishment amount ΔG2 of halogen gas in accordance with the detection output of beam profile detector 23.

First of all, detection beam width Δw is compared with target beam width Δwc (step 317). If Δw<Δwc, the replenishment amount ΔG2 is updated (step 320) with the halogen gas replenishment amount ΔG2 increased by the minute amount dG2. If Δw=Δwc, updating is performed (step 318) with the current replenishment amount ΔG2 left unchanged i.e. without increasing or decreasing the current halogen gas replenishment amount ΔG2. If Δw>Δwc, updating of the replenishment amount ΔG2 is performed (step 319) with the halogen gas replenishment amount ΔG2 lowered by the minute amount dG2. The procedure then goes to step 311 and processing for gas pressure comparison and abnormality processing are executed in the same way as in steps 111 and 112 above (steps 311, 312).

Since, as described above, with the first aspect of the present invention, the amount of supply/evacuation of laser gas is controlled such that the power of the output laser light is a target value whilst either maintaining the voltage of the power source at a fixed value or controlling the voltage so that it is kept within a fixed range, even when a charging/discharging circuit equipped with a magnetic switch is employed in a discharge-excitation type laser device, compensation for laser output fluctuations can be achieved with good controllability yet without adversely affecting energy transfer efficiency. Consequently, the durability of the main switching element can be increased by such use of a charging/discharging circuit equipped with a magnetic switch as described above, and stabilisation of laser output can be achieved easily and efficiently thanks to this improved controllability.

Embodiments of a charging/dischargindiscvice for a discharge-excitation type laser device according to the second aspect and the third aspect of the present invention will now be described.

In the second aspect and third aspect, the charging/discharging circuit has special features. Accordingly, constructional examples of the charging/discharging circuit will be described. First of all, a constructional example corresponding to the second aspect will be described.

First constructional example of the charging/discharging circuit

Figure 13:
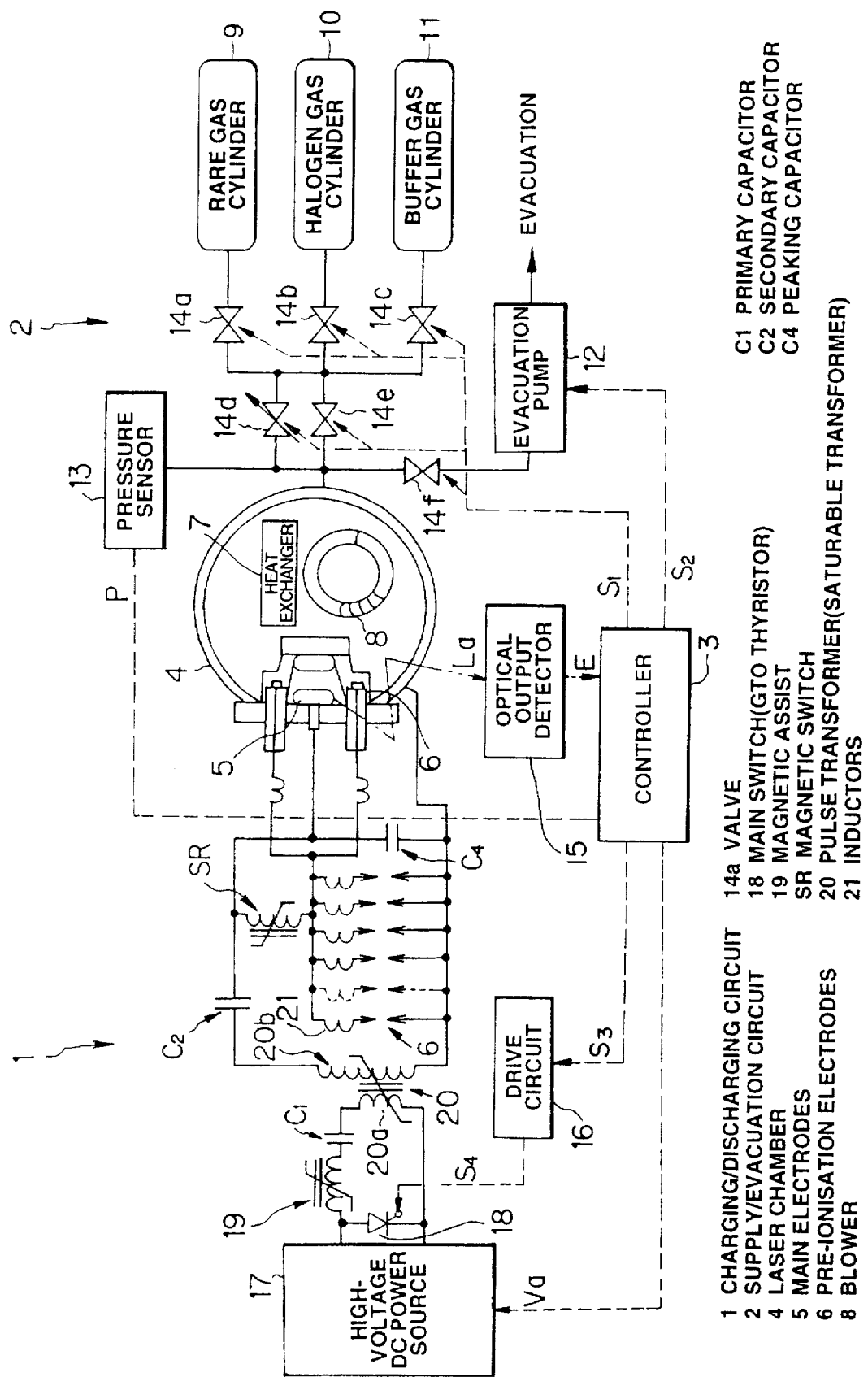
FIG. 13 is a view showing a first constructional example of a charging/discharging device for a discharge-excitation type laser device according to a second aspect of the present invention.

FIG. 13 shows a first constructional example of the charging/discharging circuit.

Specifically, charging/discharging circuit 1 is actuated by the turning ON of a GTO thyristor 18 constituting the main switch, to which is attached a magnetic assist (saturable reactor) 19. Controller 3 sends to drive circuit 16 a drive signal S3 for driving charging/discharging circuit 1, and, in response to this, drive circuit 16 applies an ON signal S4 to main switch 18, thereby actuating charging/discharging circuit 1.

It should be noted that, although a GTO thyristor was employed for main switch 18, other semiconductor switches (for example ordinary thyristors or IGBTs) or a discharge tube element (for example a thyratron or closatron) could be employed.

Charging/discharging circuit 1 is constituted by a magnetic compression circuit equipped with a pulse transformer (saturable transformer) 20. As shown in the equivalent circuit of FIG. 15, a primary capacitor C1 is connected in series with the primary winding 20a of pulse transformer 20, and a secondary capacitor C2 is connected in series with the secondary winding 20b. Pulse transformer 20 performs the action of charging secondary capacitor C2 by stepping up the voltage of the pulse current that is discharged from primary capacitor C1.

At the downstream terminal of secondary capacitor C2 there is connected a magnetic switch (saturable reactor) SR blocking the current discharged from the secondary capacitor C2. A plurality of pre-ionisation electrodes 6 are arranged in series with the magnetic switch SR. Respective stabilisation inductor 21 are connected in series with the plurality of pre-ionisation electrodes 6.

Secondary capacitor C2 and secondary winding 20b, magnetic switch SR and the plurality of pre-ionisation electrodes 6, peaking capacitor C4 and main discharging electrode 5 are thus respectively connected in parallel. Primary capacitor C1 is charged up by high voltage DC power source 17. After this, main switch 18 is turned ON, putting main switch 18 into conductive condition. The rise current is then blocked for a fixed time by magnetic assist 19, after which a pulse current discharged from primary capacitor C1, stepped up in voltage by pulse transformer 20, charges secondary capacitor C2. At this point, magnetic switch SR that is connected to the downstream terminal of secondary capacitor C2 is in saturated condition, i.e. it is in conductive condition, so current passes through the plurality of pre-ionisation electrodes 6 connected in series with the magnetic switch SR, to effect charging. The time required for the movement of the charge from capacitor C1 to capacitor C2 is 1µ to a few psec, and the peak value of the charging current at the secondary side is a few tens of A to a few hundred A.

Thus, the current passing through the excitation electrodes 6 is the charging current that effects pulse charging of the secondary capacitor C2, which is the accumulation capacitor; it can therefore be seen that its peak value is small.

From the time-point where movement of the charge to secondary capacitor C2 is completed, discharge current in the opposite direction tries to flow to secondary capacitor C2, but the reverse current is blocked by the action of magnetic switch SR; thus the current passing through pre-ionisation electrodes 6 is substantially stopped, thereby stopping the pre-ionisation discharge. Simultaneously with this, the core of pulse transformer 20 is saturated, resulting in an extremely small effective permeability, so secondary capacitor C2 and peaking capacitor C4 are put into a series-connected condition, causing movement of charge from capacitor C2 to capacitor C4 to be commenced. The period required for the movement of charge from capacitor C2 to capacitor C4 is 100 ns to a few hundred ns, and the peak current is a few hundred A to a few Ka.

With the movement of charge, the voltage of peaking capacitor C4 rises until the voltage between main electrodes 5 reaches the discharge initiation voltage. When this happens, the energy accumulated on capacitor C4 and the energy remaining on capacitor C2 are introduced into the discharge space (time required for the movement: 10 ns to a few tens of ns, peak current a few Ka to a few tens of Ka). As a result, laser oscillation is commenced due to the inverted distribution formed by the discharge.

Thus, the current passing through pre-ionisation electrodes 6 is small in value, and furthermore the pre-ionisation discharge is rapidly terminated by the action of the magnetic switch SR, rapidly shifting to main discharge. Consequently, wear of the plurality of pre-ionisation electrodes 6 is reduced, thereby enabling the drop of laser output to be prevented, since the laser gas is not contaminated by impurities.

It should be noted that, in the first constructional example, pulse transformer 20 could be a transformer that is not capable of being saturated. Also, saturable reactors could be employed instead of inductor 21, or these could be omitted altogether.

Second constructional example of the charging/discharging circuit

Figure 14:
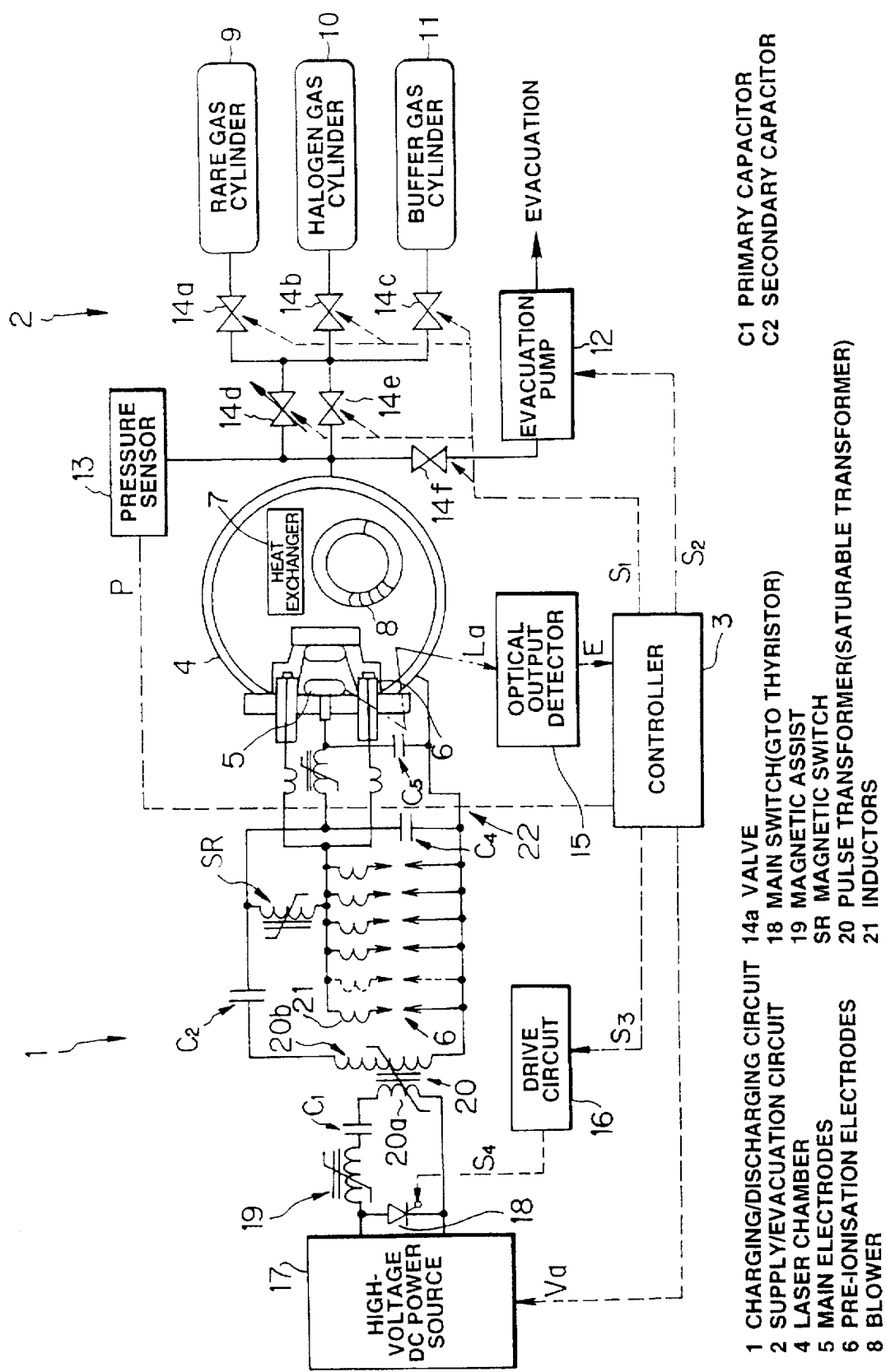
FIG. 14 is a view showing a second constructional example of a charging/discharging device for a discharge-excitation type laser device according to the second aspect of the present invention.

FIG. 14 shows a second constructional example of charging/discharging circuit 1. FIG. 16 shows its equivalent circuit.

The point of difference from the construction of FIG. 13 is that a magnetic compression circuit 22 equipped with a magnetic switch (saturable reactor) SR as described with reference to the conventional device is provided between pre-ionisation electrodes 6 and main discharge electrodes 5. In this case, the movement of charge to capacitor C4 is performed in the same way as in the first constructional example described above, while the movement of charge to capacitor C5, which is the peaking capacitor, from capacitor C4, is performed by magnetic pulse compression of the current by means of magnetic compression circuit 22.

Next, a constructional example corresponding to the third aspect will be described.

Third constructional example of the charging/discharging circuit

Figure 17:
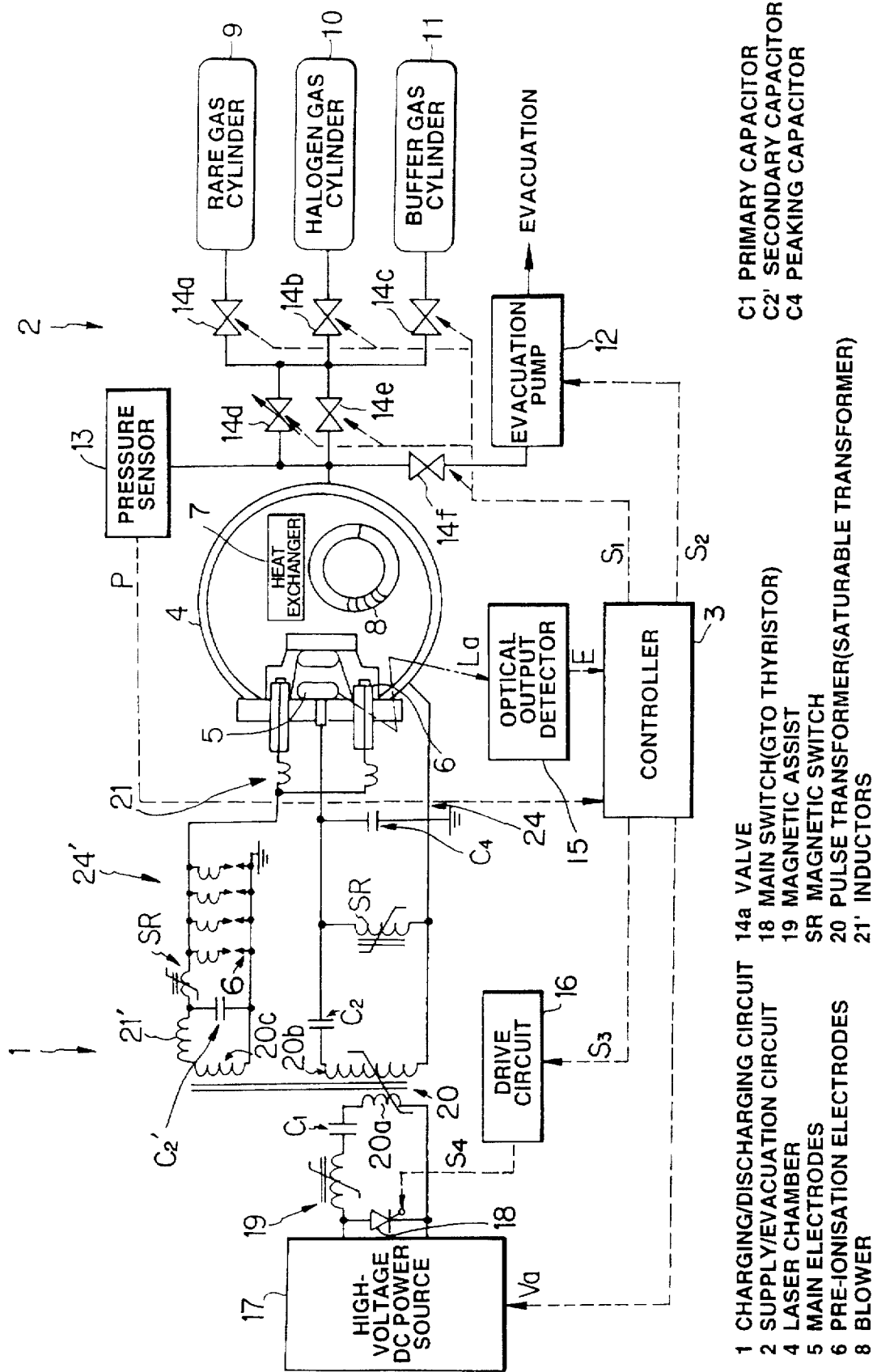
FIG. 17 is a view showing a third constructional example of a charging/discharging device for a discharge-excitation type laser device according to a third aspect of the present invention.

FIG. 17 shows a third constructional example of charging/discharging circuit 1. FIG. 19 shows an equivalent circuit thereof.

The point of difference from the first constructional example is that the secondary winding of pulse transformer 20 is separated into two: first winding 20c and second winding 20b; in this way, separation is effected into a pre-ionisation discharge-excitation circuit 24' comprising first winding 20c and secondary capacitor C2' for the pre-ionisation electrodes, and main discharge-excitation circuit 24 comprising second winding 20b and secondary capacitor C2 for the main discharge electrodes.

The operation will now be described.

When primary capacitor C1 is charged up by high voltage DC power source 17 main switch 18 is thereafter turned ON, putting main switch 18 into conductive condition. When this happens, after blockage of the rise current for a fixed time by magnetic assist 19, a pulse current discharged from primary capacitor C1 is stepped up in voltage by pulse transformer 20 and used to charge up secondary capacitor C2 for the main discharge electrodes.

Simultaneously with this, secondary capacitor C2' of pre-ionisation discharge-excitation circuit 24' is charged up, and, after blockage of the current for a fixed time by a magnetic switch (saturable reactor) SR connected in pre-ionisation discharge-excitation circuit 24', current starts to flow to the plurality of pre-ionisation electrodes 6, thereby causing pre-ionisation discharge to be commenced. The rate of this charging is adjusted by the inductance value of inductor 21' connected in series with secondary winding 20c of pulse transformer 20; adjustment of the timing with the main discharge can thereby be achieved.

At this point, magnetic switch SR connected to the downstream side of secondary capacitor C2 of main discharge-excitation circuit 24 is put into saturated condition, i.e. conductive condition, with the result that charging is performed through the magnetic switch SR. The period required for movement of the charge from capacitor C1 to capacitor C2 is 1µ to several p sec, and the peak value of the secondary charging current is a few hundred A.

Thus, the current that passes through pre-ionisation electrodes 6 is the charging current on pulse charging of secondary capacitor C2' for the pre-ionisation electrodes (constituting an accumulation capacitor), and it can be seen that its peak value is small.

From the time-point where movement of charge on to second capacitor C2 for the main discharge electrodes is completed, a reverse-direction discharge current tries to flow in secondary capacitor C2, but magnetic switch SR in main discharge-excitation circuit 24 acts to prevent the reverse current.

Simultaneously with this, the core of pulse transformer 20 becomes saturated, with the result that its effective permeability becomes extremely small, so secondary capacitor C2 and peaking capacitor C4 are put into a condition in which they are connected in series, and movement of charge from capacitor C2 to capacitor C4 is commenced. The time for the movement of charge from capacitor C2 to capacitor C4 is 100 ns to a few hundred ns, and the peak current is a few hundred A to a few Ka.

With this movement of charge, the voltage of peaking capacitor C4 rises, until the voltage across main electrodes 5 reaches the discharge initiation voltage. When this happens, the energy stored in capacitor C4 and the energy remaining in capacitor C2 are introduced into the discharge space (movement time 10 ns to a few tens of ns, peak current a few Ka to a few tens of Ka); as a result, laser oscillation is initiated by the inverted distribution created by the discharge.

The value of the current flowing through the plurality of pre-ionisation electrodes 6 is thus small, so wear of the plurality of pre-ionisation electrodes 6 is reduced, and the drop in laser output can therefore be prevented, since the laser gas is not contaminated by impurities.

Also, the pre-ionisation discharge-excitation circuit and main discharge-excitation circuit are isolated and independent, so the discharge timing of the pre-ionisation electrodes can be adjusted without affecting the discharge timing of the main discharge electrodes, thus enabling stable laser oscillation to be achieved.

It should be noted that, since, in this construction for example a magnetic switch (saturable reactor) SR is inserted in the pre-ionisation discharge-excitation circuit 24', ringing after pre-ionisation is prevented and unwanted pre-ionisation is suppressed; thus the benefit is obtained that deterioration of the pre-ionisation electrodes is prevented. In some cases, the magnetic switch SR may be dispensed with.

Also, as in the case of the first constructional example, pulse transformer 20 could be a transformer that is not saturable. Also, saturable reactors could be employed instead of inductors 21, or these could be omitted.

Fourth constructional example of the charging/discharging circuit

Figure 18:
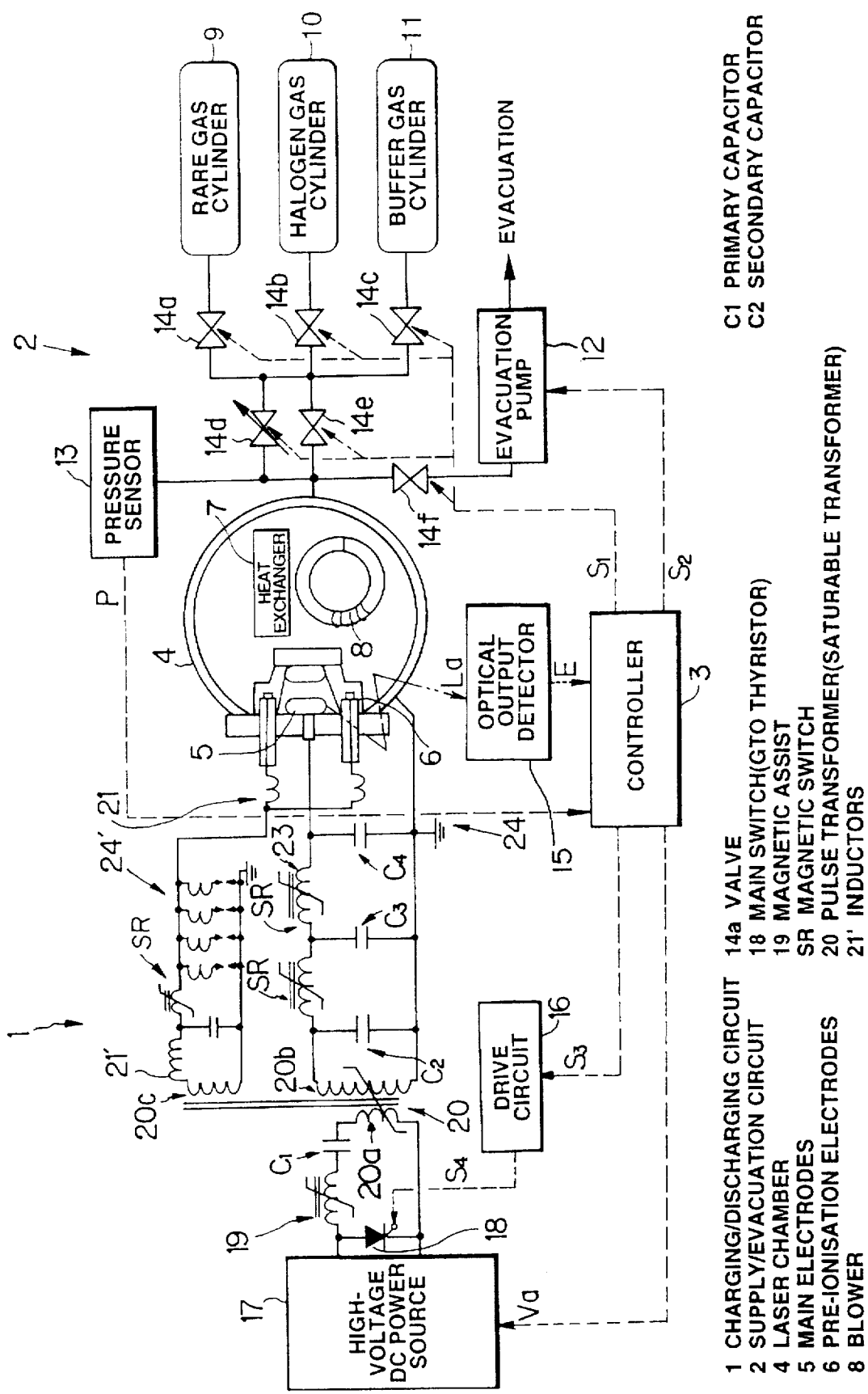
FIG. 18 is a view showing a fourth constructional example of a charging/discharging device for a discharge-excitation type laser device according to the third aspect of the present invention.

FIG. 18 shows a fourth constructional example of charging/discharging circuit 1. FIG. 20 shows an equivalent circuit thereof.

The point of difference from the third constructional example of FIG. 17 is that a two-stage magnet compression circuit 23 is provided between secondary capacitor C2 in main discharge-excitation circuit 24 and main discharge electrodes 5.

In this case, movement of the charge to capacitor C2 is performed in the same way as in the third constructional example described above, and the movement of charge from capacitor C2 through capacitor C3 to capacitor C4 which is the peaking capacitor is performed by magnetic pulse compression of the current by means of magnetic compression circuit 23.

Next, the control performed by controller 3 shown in FIG. 13, FIG. 14, FIG. 17 and FIG. 18 with reference to FIG. 21 will be described.

With commencement of operation of the laser device, first of all evacuation is performed by the vacuum pump to the prescribed gas pressure to evacuate the old gas in the laser chamber 4. Next, by opening and closing valves 14a . . . as required, rare gas, halogen gas and buffer gas are respectively successively introduced until the output P of pressure sensor 13 reaches the prescribed set values.

On the introduction of laser gas into chamber 4, sequential control of the start-up of blower 8 for gas circulation in chamber 4 and of warm-up of power source 17 are then sequentially performed, to put the laser device into a condition in which it is capable of being operated.

Figure 21:
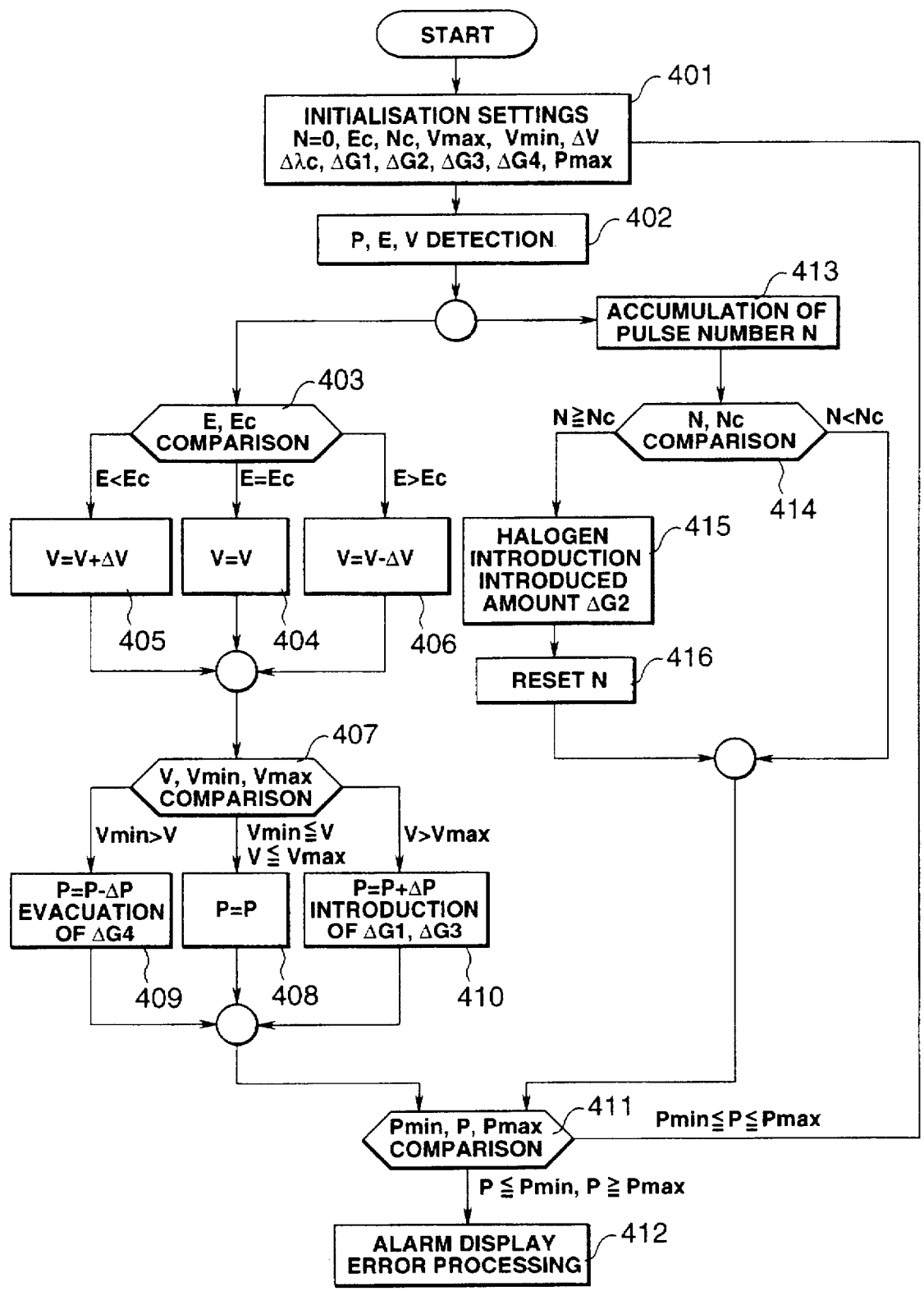
FIG. 21 is a flow chart showing the processing sequence performed by the devices shown in FIGS. 13, 14, 17 and 18.
Figure 22:
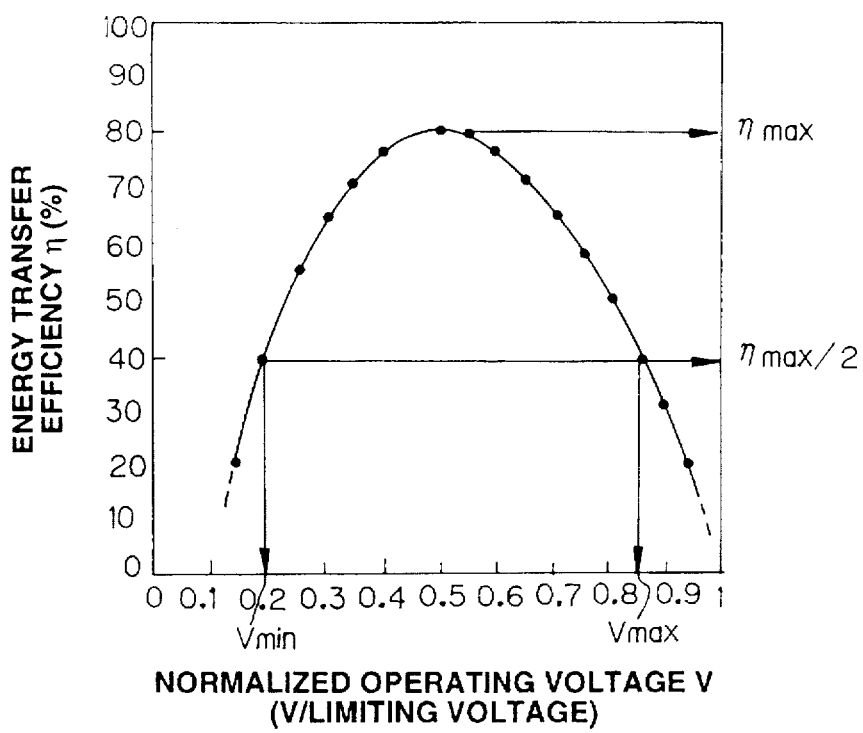
FIG. 22 is a graph showing the relationship of normalised operating voltage and energy transfer efficiency when a magnetic compression circuit is employed.
Figure 23:
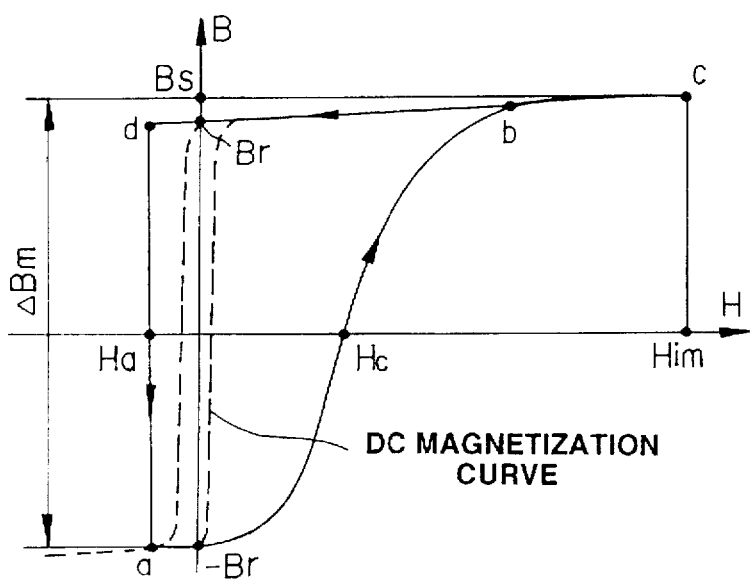
FIG. 23 is a graph showing the action of a magnetic switch core.
Figure 24:
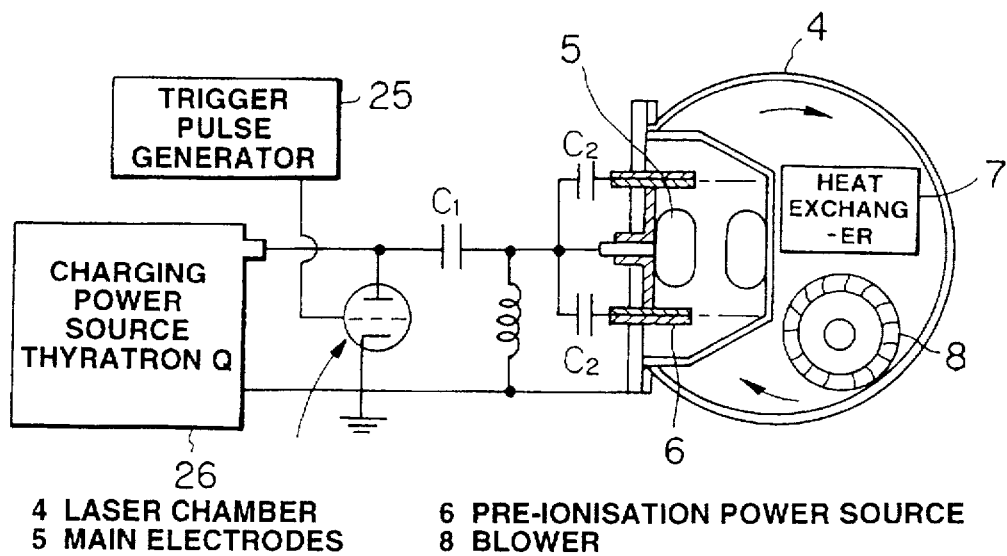
FIG. 24 is a view showing the construction of a conventional laser device.
Figure 25:
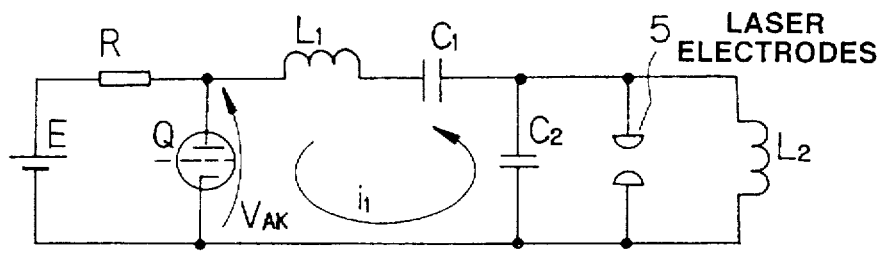
FIG. 25 is a circuit diagram showing the construction of the charging/discharging circuit of the conventional laser device.
Figure 26:
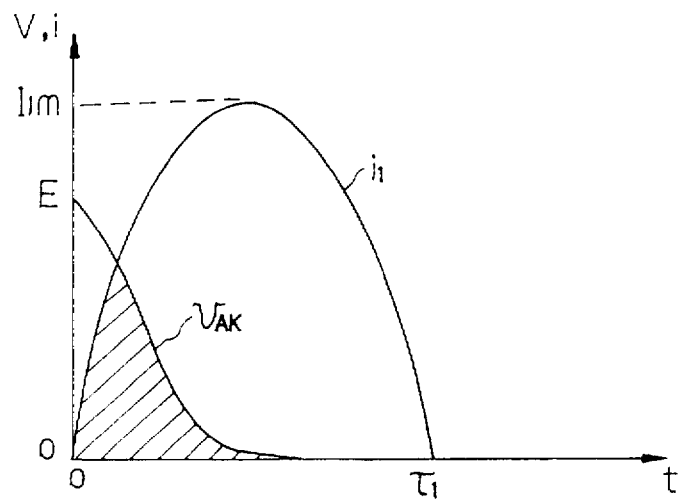
FIG. 26 is a graph showing the voltage and current waveforms of the main switch in the circuit of FIG. 25.
Figure 27:
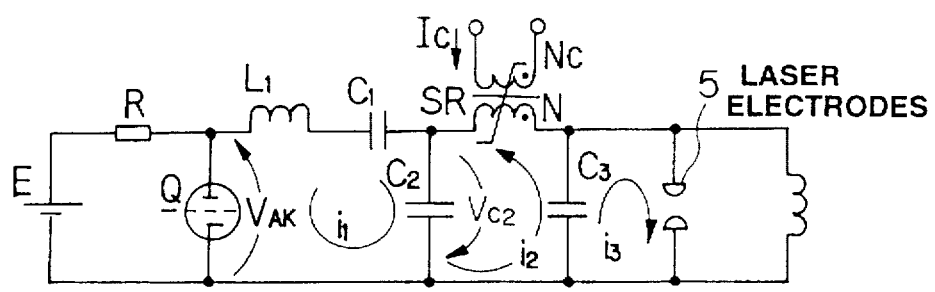
FIG. 27 is a circuit diagram showing a magnetic compression circuit.
Figure 28:
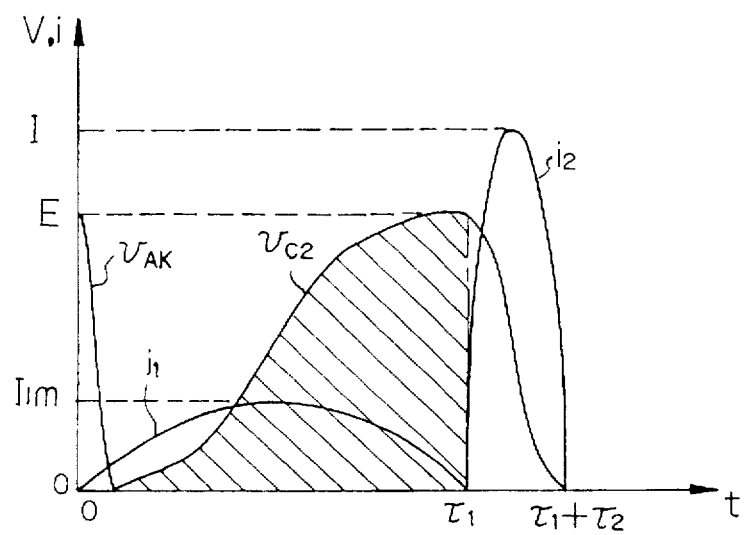
FIG. 28 is a graph showing the voltage and current waveforms of the various parts of the magnetic compression circuit of FIG. 27.

Thereupon, prior to operation of the laser device, first of all, as shown in step 401 of FIG. 21, there are pre-set the target laser output Ec, the pulse number interval Nc in respect of halogen gas introduction, the charging voltage amount of change $\Delta V$ the replenishment gas amount for one occasion in respect of rare gas $\Delta G1$, the replenishment gas amount on one occasion in respect of halogen gas $\Delta G2$, the replenishment gas amount on one occasion in respect of buffer gas $\Delta G3$, and the replenishment gas amount on one occasion in respect of evacuated gas $\Delta G4$, and the limiting gas pressures (Pmax, Pmin), and resetting (N=0) of the pulse count number is performed.

After this, when operation of the laser device is commenced, there are successively input to controller 3 the laser output E detected by optical output detector 15, the chamber pressure P detected by pressure sensor 13, and the charging voltage V detected by a voltage detector. However, charging voltage V can be substituted by command voltage Va (step 402).

Controller 3 compares the detected laser output E with the target laser output Ec (step 403). If E<Ec, it increases the charging voltage V by the minute voltage $\Delta V$ and takes this as the command charging voltage Va (step 405). If E=Ec, it makes the detected voltage V the command charging voltage Va without modifying it (step 404). If E>Ec, it lowers the detected charging voltage V by the minute voltage $\Delta V$ before taking it as the command charging voltage Va (step 406).

In general, when control is performed such as to approach a target value, because of considerations regarding detector resolution and various types of noise, a don't care zone is provided. The target laser output Ec may therefore have a certain width. That is, a target range may be set up and control exercised such that the laser output comes within this target range.

Further, controller 3 compares the command charging voltage Va (current charging voltage V) with the maximum value Vmax and the minimum value Vmin of the charging voltage control range Vm (step 407), and, if Va≦Vmax and Va≧Vmin, with the gas pressure P maintained at the current pressure (step 408) proceeds to the next step 411.

However, if command charging voltage Va is such that Va>Vmax, processing is performed to effect replenishment into laser chamber 4 of the prescribed amount of rare gas $\Delta G1$ and the prescribed amount of buffer gas $\Delta G3$ from rare gas cylinder 9 and buffer gas cylinder 11, thereby increasing gas pressure P by a minute amount $\Delta P$, before proceeding to step 411 (step 410). And if Va<Vmin, processing is performed to evacuate a prescribed amount $\Delta G4$ of laser gas from laser chamber 4 so that the gas pressure P is reduced by the minute amount $\Delta P$ before going to step 411 (step 409).

Usually, due to generation of gaseous impurities and contamination or damage to the window etc., the laser output tends to fall, so the total pressure rises with gas replenishment, so an evacuation step can often be omitted. The processing of step 409 may therefore be omitted.

Control of replenishing the halogen gas is also performed during operation of the laser device (steps 413 to 416).

Specifically, during operation of the laser device the halogen gas is decreased by reaction etc. with electrode evaporation products, the amount of the decrease being proportional to the operating time i.e. to the number of operating pulses N. Accordingly, in order to replenish the halogen gas by an amount proportional to the number of operating pulses N, every time the count pulse number N reaches a prescribed value Nc, halogen gas is replenished by a prescribed amount $\Delta G2$. And at the time-point where the halogen gas replenishment is performed, the count number N is reset to zero, after which the procedure goes to the subsequent processing of step 411 (steps 414, 415, 416). In this control example, pulse number N was found by counting the detection signal of optical output detector 15, but it could be found by counting the trigger signal that constitutes the oscillation command.

In step 411, a decision is made as to whether or not gas pressure P in laser chamber 4 is within the prescribed range Pmin≦P≦Pmax. If this pressure range is exceeded, it is difficult to maintain laser output E, so abnormality processing is performed involving output of a service request signal etc. for gas replacement or replacement of defective components, prescribed error display, or error processing (step 412).

It should be noted that, although, in this control example, the charging voltage V was controlled such that it came within a charging voltage control range Vm, it would be possible to keep the charging voltage fixed and to perform solely supply/evacuation control of the laser gas.

In this case, following on from the processing of step 403, the processing of steps 408 to 410 is performed (instead of the processing of steps 404 to 406), before the procedure goes to step 411.

Specifically, controller 3 compares the detected laser output E with a target laser output Ec (step 403). If E<Ec, processing is performed to evacuate a prescribed amount ΔG4 of laser gas from within laser chamber 4 (step 409). If E=Ec, gas pressure P is maintained at the current pressure (step 408). If E>Ec, processing is performed to replenish laser chamber 4 with the prescribed amount of rare gas ΔG1 and buffer gas ΔG3 from rare gas cylinder 9 and buffer gas cylinder 11 (step 410).

In this control example, processing to effect halogen gas supply is performed periodically (step 413 to 416), but, depending on the circumstances, this could be omitted. Also, the supply of halogen gas could be combined with supply of another rare gas or buffer gas in step 410.

Also, in this control example, charging voltage V was directly detected, but, since charging voltage V and beam width Δw of the laser light La are in practically proportional relationship, the charging voltage V could be detected by detecting the beam width Δw. In this connection, beam width Δw means the width in the direction perpendicular to the discharge direction between main electrodes 5,5; this can be detected by directing the laser light on to a line sensor.

Also, since the charging voltage V and the spectral bandwidth Δλ (e.g. the half-width) in the spectral distribution of the frequency of the laser light La are in practically proportional relationship, the charging voltage V could be detected by detecting the spectral bandwidth Δλ.

As described above, with the control example shown in FIG. 21, by controlling the laser gas supply/evacuation amount such that the power of the output laser light is a target value, whilst controlling the power source voltage to a constant value or controlling the voltage to keep it within a fixed range, compensation of laser output fluctuation can be achieved with good controllability even when a charging/discharging circuit provided with a magnetic switch is applied to a discharge-excitation type laser device.

As described above, with the second and third aspects of the present invention, the charging/discharging device is constructed such that the current that passes through the pre-ionisation electrodes has a small value, so durability of the pre-ionisation electrodes is increased and deterioration of the laser gas due to impurities can be reduced, thereby enabling the drop in laser output to be prevented.

INDUSTRIAL APPLICABILITY

The charging/discharging device illustrated in this specification can be widely applied in technical fields other than the laser technical field.

We claim:

1. A laser gas controller for a discharge-excitation type laser device comprising a charging/discharging circuit having a power source, a main switch for applying the voltage of the power source to the discharge electrodes, and a magnetic switch provided between the main switch and the discharge electrodes, for blocking the current flowing from the power source to the discharge electrodes for a period of time dependent on the magnitude of the voltage of the power source, laser light oscillation and output being achieved by supplying laser gas into a laser chamber where the discharge electrodes are arranged and exciting the laser gas by discharge between the discharge electrodes, wherein the laser gas controller comprises:
output detection means for detecting the output of the laser light; and
control means, if it is detected that the output of the laser light detected by the output detection means departs from a target value or a target range, for controlling the amount of laser gas supplied to the laser chamber or the amount of laser gas evacuated from the laser chamber such that the output of the laser light coincides with the target value or comes within the target range whilst maintaining the voltage of the power source at a fixed value that allows energy transfer efficiency of the charging/discharging circuit to be a predetermined value.

2. A laser gas controller for a discharge-excitation type laser device according to claim 1, further comprising spectral bandwidth detection means for detecting a spectral bandwidth in the frequency spectrum distribution of the laser light, wherein, if the spectral bandwidth detected by the spectral bandwidth detection means is detected to have departed from a target spectral bandwidth, the laser gas controller exercises control such as to either supply laser gas into the laser chamber or to evacuate laser gas from the laser chamber so that the spectral bandwidth becomes the target spectral bandwidth.

3. A laser gas controller for a discharge-excitation type laser device according to claim 1, further comprising beam width detection means for detecting a beam width in a direction substantially perpendicular to the discharge direction between the discharge electrodes, wherein, if the beam width detected by the beam width detection mean is detected to have departed from a target beam width, the laser gas controller exercises control such as to either supply laser gas into the laser chamber or to evacuate laser gas from the laser chamber so that the beam width becomes the target beam width.

4. A laser gas controller for a discharge-excitation type laser device comprising a charging/discharging circuit having a power source, a main switch for applying the voltage of the power source to the discharge electrodes, and a magnetic switch provided between the main switch and the discharge electrodes, for blocking the current flowing from the power source to the discharge electrodes for a period of time dependent on the magnitude of the voltage of the power source, laser light oscillation and output being achieved by supplying laser gas into a laser chamber where the discharge electrodes are arranged and exciting the laser gas by discharge between the discharge electrodes, wherein the laser gas controller comprises:
output detection means for detecting the output of the laser light; and
voltage control means for changing the voltage of the power source such that the output of the laser light coincides with a target value or comes within a target range when the output of the laser light detected by the output detection means departs from the target value or the target range; and
supply/evacuation control means for controlling the amount of laser gas supplied to the laser chamber or the amount of laser gas evacuated from the laser chamber such that a voltage of the power source is brought within the voltage adjustment range if the voltage of the power source has got outside a voltage adjustment range as a result of the change of the voltage of the power source by the voltage control means, wherein the voltage adjustment range of the power source that allows energy transfer efficiency of the charging/discharging circuit to be a predetermined value or greater is pre-set.

5. A laser gas controller for a discharge-excitation type laser device according to claim 4, further comprising spectral bandwidth detection means for detecting a spectral bandwidth in frequency spectrum distribution of the laser light, wherein, if the spectral bandwidth detected by the spectral bandwidth detection means is detected to have departed from a target spectral bandwidth, the laser gas controller exercises control such as to either supply laser gas into the laser chamber or to evacuate laser gas from the laser chamber so that the spectral bandwidth becomes a target spectral bandwidth.

6. A laser gas controller for a discharge-excitation type laser device according to claim 4, further comprising beam width detection means that detects the beam width in a direction practically perpendicular to the discharge direction between the discharge electrodes, and, if the beam width detected by the beam width detection mean is detected to have departed from a target beam width, exercises control such as to either supply laser gas into the laser chamber or to evacuate laser gas from the laser chamber so that the beam width becomes the target beam width.

7. A charging/discharging device for a discharge-excitation type laser device comprising a power source, a main switch for applying the voltage of the power source to pre-ionisation electrodes and main discharge electrodes, and capacitors of a plurality of stages provided between the main switch and the pre-ionisation electrodes and main discharge electrodes, electric charge accumulated on a first-stage capacitor by the power source being moved to second and subsequent-stage capacitors by the actuation of the main switch so as to effect pre-ionisation discharge between the pre-ionisation discharge electrodes and main discharge between the main discharge electrodes in accordance with the accumulated charge of a last-stage capacitor, the laser gas being excited by the main discharge between the main discharge electrodes so as to oscillate and output laser light, wherein the charging/discharging device comprises:

a pulse transformer whose primary winding is connected in series with the first-stage capacitor and whose secondary winding is divided into first and second windings so as to form a pre-ionisation discharge circuit comprising the first winding and the second-stage capacitor for the pre-ionisation electrodes and a main discharge circuit comprising the second winding and a second-stage capacitor for the main discharge electrodes, the main discharge circuit being isolated from the pre-ionisation discharge circuit.

8. A charging/discharging device for a discharge-excitation type laser device according to claim 7, further comprising an inductor connected in series with the first winding of the pre-ionisation discharge-excitation circuit, for adjusting the timing of the pre-ionisation discharge and the main discharge.

9. A charging/discharging device for a discharge-excitation type laser device according to claim 7, further comprising a magnetic switch at the downstream side of the second-stage capacitor for the main discharging electrodes, for blocking current discharged from the second-stage capacitor, the magnetic switch, the final-stage third-stage capacitor and the main discharge electrodes being respectively connected in parallel.

10. A charging/discharging device for a discharge-excitation type laser device according to claim 7, further comprising a magnetic compression circuit provided between the second-stage capacitor for the main discharge electrodes and the main discharge electrodes.

* * * * *